(12) United States Patent
Giannakis et al.

(10) Patent No.: US 9,863,985 B2
(45) Date of Patent: Jan. 9, 2018

(54) STATE ESTIMATION OF ELECTRICAL POWER NETWORKS USING SEMIDEFINITE RELAXATION

(71) Applicant: Regents of the University of Minnesota, St. Paul, MN (US)

(72) Inventors: Georgios B. Giannakis, Minnetonka, MN (US); Hao Zhu, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 1063 days.

(21) Appl. No.: 13/862,139

(22) Filed: Apr. 12, 2013

(65) Prior Publication Data

US 2013/0304266 A1  Nov. 14, 2013

Related U.S. Application Data

(60) Provisional application No. 61/623,943, filed on Apr. 13, 2012.

(51) Int. Cl.

| | |
|---|---|
| *G01R 21/133* | (2006.01) |
| *G06Q 20/14* | (2012.01) |
| *H02J 3/06* | (2006.01) |
| *H02J 13/00* | (2006.01) |
| *H02J 3/00* | (2006.01) |

(52) U.S. Cl.
CPC ......... *G01R 21/133* (2013.01); *G06Q 20/145* (2013.01); *H02J 3/06* (2013.01); *H02J 13/0006* (2013.01); *H02J 2003/007* (2013.01); *Y02E 60/76* (2013.01); *Y04S 40/22* (2013.01)

(58) Field of Classification Search
CPC .... G01R 21/133; H02J 3/06; H02J 2003/007; H02J 13/0006; G06Q 20/145; Y04S 40/22; Y02E 60/76

USPC .................................................. 700/286
See application file for complete search history.

(56) References Cited

U.S. PATENT DOCUMENTS

| | | | |
|---|---|---|---|
| 2008/0059088 A1* | 3/2008 | Atanackovic | G01R 21/1271 702/60 |
| 2011/0130886 A1* | 6/2011 | Drees | G05B 15/02 700/291 |
| 2012/0179301 A1* | 7/2012 | Aivaliotis | H02J 3/00 700/286 |
| 2013/0018821 A1* | 1/2013 | Shao | G06Q 50/06 705/412 |

(Continued)

OTHER PUBLICATIONS

Gomez-Exposito, "On the Use of PMUs in Power System State Estimation", Aug. 22-26, 2011, 17th power system computation conference, p. 1-13.*

(Continued)

*Primary Examiner* — Sean Shechtman
*Assistant Examiner* — Alan Chu
(74) *Attorney, Agent, or Firm* — Shumaker & Sieffert, P.A.

(57) ABSTRACT

A semidefinite (SDR) programming formulation for state estimation (SE) of nonlinear AC power systems is described. The techniques make use of convex semidefinite relaxation of the original problem to render the process efficiently solvable. In addition, robust techniques are described that are resilient to outlying measurements and/or adversarial cyber-attacks. Further, techniques for SDR-based SE are described in which local control areas solve the centralized SDP-based SE problem in a distributed fashion.

29 Claims, 11 Drawing Sheets

(56) References Cited

U.S. PATENT DOCUMENTS

| | | | | |
|---|---|---|---|---|
| 2013/0238294 | A1* | 9/2013 | Legbedji | G06Q 50/06 703/2 |
| 2013/0262001 | A1* | 10/2013 | Sun | H02J 3/00 702/60 |

OTHER PUBLICATIONS

Gomez-Exposito, "A Taxonomy of multi-area stae estimation methods", Dec. 19, 2010, Elsevier, p. 1-10.*
Handschin, "Bad Data Analysis for power system state estimation", Mar./Apr. 1975, IEEE Transcations on Power Apparatus and Systems, PAS-94 No. 2, p. 1-9.*
Liu, "False Data Injection Attacks against State Estimation in Electric Power Grids", May 2011, ACM Trans. Info. Sys., Sec 14, 1, Article 13, pp. 2-33.*
Javad Lavaei, "Zero Duality Gap in Optimal Power Flow Problem", Feb. 2012, IEEE, vol. 27, 92-107.*
Lavaei, Javad "Convexification of Optimal Power Flow Problem", Sep. 29, 2010, IEEE, pp. 223-232.*
R. Balkrick et al., "A Fast Distributed Implementation of Optimal Power Flow," IEEE Transactions on Power Systems, vol. 14, No. 3, Aug. 1999, pp. 858-864.
F. Lu et al., "Fuzzy Dynamic Programming Approach to Reactive Power/Voltage Control in a Distribution Substation," IEEE Transactions on Power Systems, vol. 12, No. 2, May 1997, pp. 681-688.
S. Paudyal et al., "Optimal Operation of Distribution Feeders in Smart Grids," IEEE Transactions on Industrial Electronics, vol. 58, No. 10, Oct. 2011, pp. 4495-4503.
A. Monticelli, "Electric Power System State Estimation," Proceedings of the IEEE, vol. 88, No. 2, Feb. 2000, pp. 262-282.
Z. Luo et al., "Semidefinite Relaxation of Quadratic Optimization Problems," IEEE Signal Processing Magazine, May 2010, pp. 20-34.
J. Lavaei, "Zero Duality Gap in Optimal Power Flow Problem," IEEE Transaction on Power Systems, vol. 1, No. 1, Feb. 2012, 16 pages.
J. Lavaei et al., "Geometry of Power Flows in Tree Networks," IEEE Power Ener. So. Gen. Mett, Jul. 2012, 8 pages.
O. Kosut, "Malicious Data Attacks on the Smart Grid," IEEE Transactions on Smart Grid, vol. 2, No. 4, Dec. 2011, pp. 645-658.
W.H. Kersting, "Radial Distribution Test Feeders," IEEE Power Engineering Society Winter Meetings, vol. 2, Jan. 28-Feb. 1, 2001, pp. 908-912.
V. Kekatos, "Distributed Robust Power System State Estimation," IEEE Transactions on Power Systems, vol. 28, No. 2, May 2013, pp. 1617-1626.
R.A. Jabr, "Exploiting Sparsity in SDP Relaxations of the OPF Problem," IEEE Transactions on Power System, vol. 27, No. 2, May 2012, pp. 1138-1139.
N. Hatziargyriou, "Microgrids: An Overview of Ongoing Research, Development and Demonstration Projects," IEEE Power & Energy Magazine, vol. 5, No. 4, Jul.-Aug. 2007, pp. 78-94.
J. Guerrero, "Advanced Control Architectures for Intelligent Microgrids—Part I: Decentralized and Hierarchical Control," IEEE Transactions on Industrial Electronics, vol. 60, No. 4, Apr. 2013, pp. 1254-1262.
E. Tedeschi et al., "Synergistic Control and Cooperative Operation of Distributed Harmonic and Reactive Compensators," in IEEE Power Electronics Specialists Conference, Jun. 15-19, 2008, pp. 654-660.
S. Boyd et al., "Distributed Optimization and Statistical Learning via the Alternating Direction Method of Multipliers," Foundations and Trends in Machine Learning, vol. 3, No. 1, pp. 1-122, Jan. 2011.
S. Bolognani et al., "A Distributed Control Startegy for Reactive Power Compensation in Smart Microgrids," Oct. 2, 2012, 16 pages.
M.R. Irving et al., "Efficient Newton-Raphson Algorithm for Load-Flow Calculation in Transmission and Distribution Networks," IEE Proceedings—C Generation, Transmission and Distribution, vol. 134, Pt. C, No. 5, pp. 325-330, Sep. 1987.
P. Carvalho et al., "Distributed Reactive Power Generation Control for Voltage Rise Mitigation in Distribution Networks," IEEE Transactions on Power Systems, vol. 23, No. 2, pp. 766-772, May 2008.
G. Hug-Glanzmann et al., "Decentralized Optimal Power Flow Control for Overlapping Areas in Power Systems," IEEE Transactions on Power Systems, vol. 24, No. 1, pp. 327-336, Feb. 2009.
B. Zhang et al., "Optimal Distributed Voltage Regulation in Power Distribution Networks," Aug. 20, 2013, 24 pages, available at http://arxiv.org/pdf/1204.5226.pdf.
X. Bai et al., "Semi-definite Programming-Based Method for Security-Constrained Unit Commitment with Operational and Optimal Power Flow Constraints," IET Generation, Transmission & Distribution, Dec. 12, 2007, 16 pages.
S. Bruno et al., "Unbalanced Three-Phase Optimal Power Flow for Smart Grids," IEEE Transactions on Industrial Electronics, vol. 58, No. 10, pp. 4504-4513, Oct. 2011.
E.J. Candes et al., "Near-Optimal Signal Recovery from Random Projections: Universal Encoding Strategies?", IEEE Transactions on Information Theory, vol. 52, pp. 5406-5425, Dec. 2006.
C. Carlet et al., "Highly Nonlinear Mappings," Journal of Complexity, vol. 20, No. 2-3, pp. 205-244, Apr. 2004.
R.B. Bobba et al., "Detecting False Data Injection Attacks on DC State Estimation," Proc First Workshop on Secure Control, Systems, Stockholm, Sweden, Apr. 2010, 9 pages.
F.J. Nogales et al., "A Decomposition Methodology Applied to the Multi-Area Optimal Power Flow Problem," Annals of Operations Research 120, pp. 99-116, Apr. 2003.
A. Gomez-Exposito et al., "A Multilevel State Estimation Paradigm for Smart Grids," Proceedings of the IEEE, vol. 99, No. 6, pp. 952-976, Jun. 2011.
B.H. Kim et al., "Coarse-Grained Distributed Optimal Power Flow," IEEE Transactions on Power Systems, vol. 12, No. 2, pp. 932-939, May 1997.
R.D. Zimmerman et al., "MATPOWER: Steady-State Operations, Planning and Analysis Tools for Power Systems Research and Education," IEEE Transactions on Power Systems, vol. 26, No. 1, pp. 12-19, Feb. 2011.
H. Zhu et al., "Estimating the State of AC Power Systems Using Semidefinite Programming," Proc. The 43rd NAPS, pp. 1-7, Boston, MA, Aug. 4-6, 2011.
A. Y. S. Lam, B. Zhang and D. Tse, "Distributed Algorithms for Optimal Power Flow Problem," 12 pages, Sep. 24, 2011, [Online]. Available: http://arxiv.org/abs/1109.5229.
L. Xie et al., "Cooperative Distributed State Estimation: Local Observability Relaxed," in Proc. IEEE PES General Meeting, Detroit, MI, Jul. 24-29, 2011, 8 pp.
S. Paudyal et al., "Three-Phase Distribution OPF in Smart Grids: Optimality Versus Computational Burden," in 2nd IEEE PES Intl. Conf. and Exhibition on Innovative Smart Grid Technologies, Manchester, UK Dec. 2011, 9 pp.
J.F. Sturm, "Using SeDuMi 1.02, A Matlab Toolbox for Optimization Over Symmetric Cones," Optimization Methods Software, vol. 11-12, pp. 625-653, Aug. 1999 [online] Available: http://plato.asu.edu/ftp/usrguide.pdf.
E. Sortomme and M.A. El-Sharkawi, "Optimal Power Flow for a System of Microgrids with Controllable Loads and Battery Storage," in IEEE/PES Power Systems Conference and Exposition, Seattle, WA, Mar. 2009, 5 pp.
R. Grone et al., "Positive Definite Completions of Partial Hermitian Matrices," Linear Algebra and its Applications, vol. 58, pp. 109-124, Apr. 1984.
A. Gomez-Exposito et al., "On the Use of PMUs in Power System State Estimation," Proc. 17th Power Systems Computation Conference, Stockholm, Sweden, Aug. 22-26, 2011, 13 pp.
G.B Giannakis et al., "USPACOR: Universal Sparsity-Controlling Outlier Rejection," Proc. of Intl. Conf. on Acoustics, Speech and Signal Processing, Prague, Czech Republic, May 22-27, 2011, pp. 1952-1955.
D. Forner et al., "On Efficient Use of Local Sources in Smart Grids with Power Quality Constraints," in Proc. of IEEE Int. Conf. on Smart Grid Comm., Gaithersburg, MD, Oct. 2010, 6 pp.

(56) References Cited

OTHER PUBLICATIONS

Y. Liu et al., "False Data Injection Attacks Against State Estimation in Electric Power Grids," Proceedings of the 16th ACM Conference on Computer and Communications Security, Chicago, IL, Nov. 2009, pp. 21-32.

A. Abur et al., "Power System State Estimation Theory and Implementation," Mar. 24, 2004, Marcel Dekker, Inc., Chapters 1-9, 336 pages.

U.S. Department of Energy, "The Smart Grid: An Introduction," 48 pages, 2008 [online] available: http://www.oe.energy.gov/SmartGridIntroduction.htm.

Kraning et al., "Message Passing for Dynamic Network Energy Management," 30 pages, Apr. 6, 2012 [online]. Available: http://arxiv.org/pdf/1204.1106.pdf.

Xu et al., "Sparse Recovery From Nonlinear Measurements with Applications in Bad Data Detection for Power Networks," Dec. 2011 (submitted)., 30 pp. [online] available: http://arxiv.org/abs/1112.6234.

Grant et al., "CVX: Matlab Software for Disciplined Convex Programming," Version 2.0, Jul. 2013. [online]., 3 pp. Available: http:cvxr.com/cvx.

Lam et al., "Distributed Algorithms for Optimal Power Flow Problem," Nov. 2011, [Online], 12 pp. Available at http://arxiv.org/abs/1109.5229.

Power Systems Test Case Archive, University of Washington, downloaded on Jul. 30, 2013, 1 page, [online] avaliable: http://www.ee.washington.edu/research/pstca/.

Zhu et al., "Robust Power System State Estimation for the Nonlinear AC Flow Model," Jun. 21, 2012, available: http://arxiv.org/pdf/1206.4900.pdf, 7 pages.

\* cited by examiner

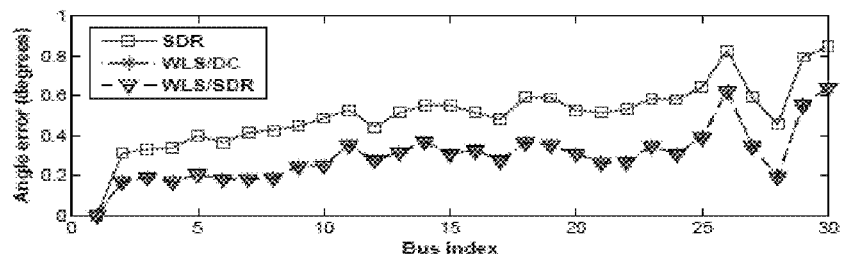
FIG. 3A1
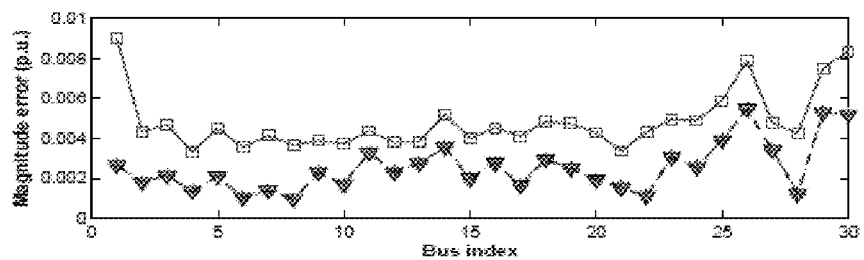
FIG. 3A2
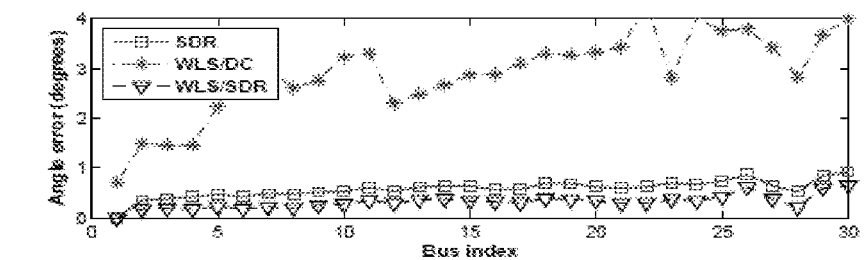
FIG. 3B1
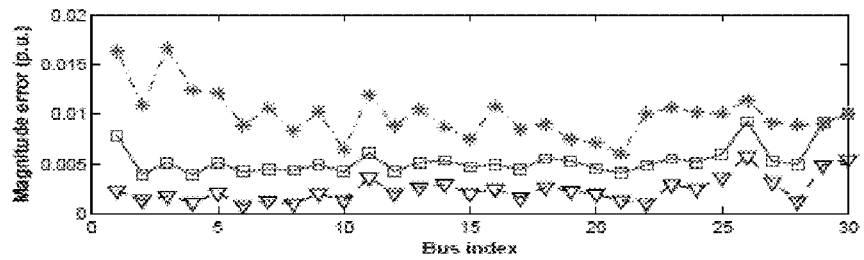
FIG. 3B2

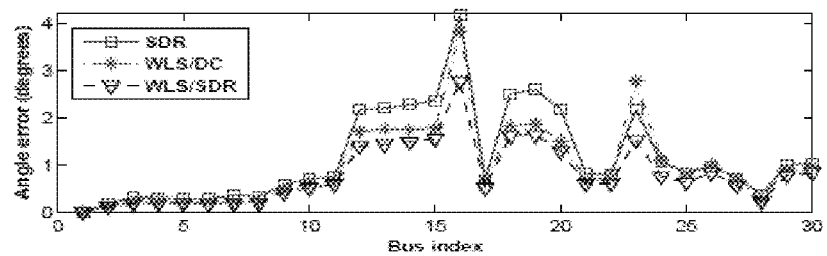
FIG. 4A1
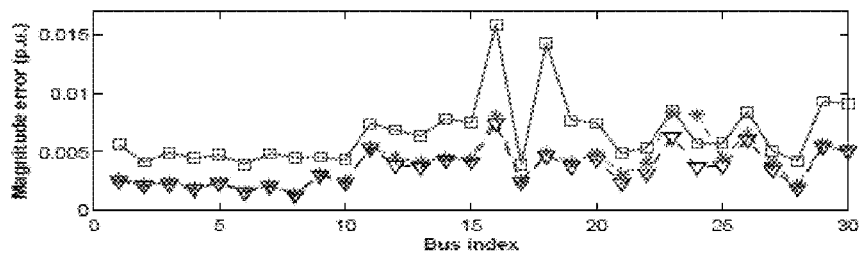
FIG. 4A2
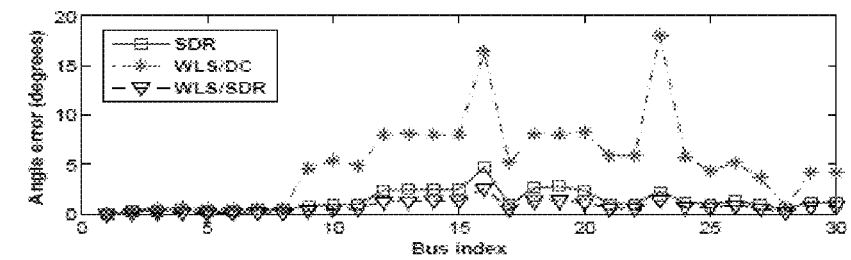
FIG. 4B1
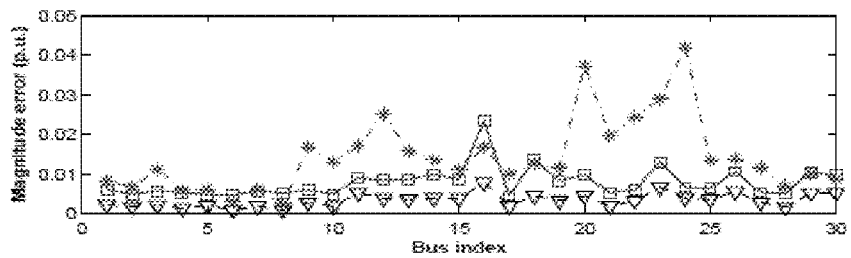
FIG. 4B2

STATE ESTIMATION OF ELECTRICAL POWER NETWORKS USING SEMIDEFINITE RELAXATION

This application claims the benefit of U.S. Provisional Application No. 61/623,943, filed Apr. 13, 2012, the entire content of which is incorporated herein by reference.

TECHNICAL FIELD

This disclosure relates to electrical power systems, and more specifically to monitoring electrical power systems.

BACKGROUND

The electric power grid is a complex system consisting of multiple subsystems, each with a transmission infrastructure spanning over a huge geographical area, transporting energy from generation sites to distribution networks. Monitoring the operational conditions of grid transmission networks is of paramount importance to facilitate system control and optimization tasks, including security analysis and economic dispatch under security constraints.

SUMMARY

In general, this disclosure is directed to monitoring techniques that can estimate system state of electrical power busses within large-scale power grids. In some examples, as further explained below, multi-area state estimation may be performed in a distributed fashion for multiple interconnected "subgrids." In addition, robust techniques are described that are resilient to outlying measurements and/or adversarial cyber-attacks.

In one embodiment, a method for estimating a state for each of a plurality of alternating current (AC) electrical power buses within a power grid includes receiving, with an energy management system for the power grid, measurements of an electrical characteristic from a plurality of measurement units (MUs) positioned at a subset of the power buses within the power grid. The method further includes processing the measurements of the electrical characteristic with the energy management system to compute an estimate of the electrical characteristic at each of the power buses within the power grid, the estimates of the electrical characteristic being nonlinearly related to the measurements of the electrical characteristic, wherein processing the measurements of the electrical characteristic comprises applying semidefinite relaxation to compute a semidefinite programming model for the power buses within the power grid that linearly relates the estimates for the electrical characteristic to the measurements of the electrical characteristic, and iteratively processing the measurements of the electrical characteristic in accordance with the semidefinite programming model to compute a convex minimization as a solution for the estimates of the electrical characteristic.

In another embodiment, a device includes memory to store measurements of an electrical characteristic from a plurality of measurement units (MUs) positioned at a subset of alternating current (AC) electrical power buses within a power grid, and one or more processors configured to execute program code to process the measurements of the electrical characteristic to compute an estimate of the electrical characteristic at each of the power buses within the power grid, the estimates of the electrical characteristic being nonlinearly related to the measurements of the electrical characteristic, wherein the program code is configured to apply semidefinite relaxation to compute a semidefinite programming model for the power buses within the power grid that linearly relates the estimates for the electrical characteristic to the measurements of the electrical characteristic, and iteratively process the measurements of the electrical characteristic in accordance with the semidefinite programming model to compute a convex minimization as a solution for the estimates of the electrical characteristic.

In this disclosure, the following notation is used: Upper (lower) boldface letters will be used for matrices (column vectors); $(\cdot)^T$ denotes transposition; $(\cdot)^H$ complex-conjugate transposition; $\text{Re}(\cdot)$ the real part; $\text{Im}(\cdot)$ the imaginary part; $\text{Tr}(\cdot)$ the matrix trace; $\text{rank}(\cdot)$ the matrix rank; $\mathbf{0}$ the all-zero matrix; $|\cdot|_p$ the vector p-norm for $p \geq 1$; and $|\cdot|$ the magnitude of a complex number.

The details of one or more embodiments are set forth in the accompanying drawings and the description below. Other features, objects, and advantages will be apparent from the description and drawings, and from the claims.

BRIEF DESCRIPTION OF DRAWINGS

FIGS. 3A1, 3A2, 3B1 and 3B2 compare estimation errors in voltage magnitudes and angles between semidefinite relaxation (SDR) and weighted least-squares (WLS) solvers at different buses.

FIGS. 4A1, 4A2, 4B1 and 4B2 are graphs that compare estimation errors in voltage magnitudes and angles between SDR and WLS solvers.

DETAILED DESCRIPTION

Figure 1:
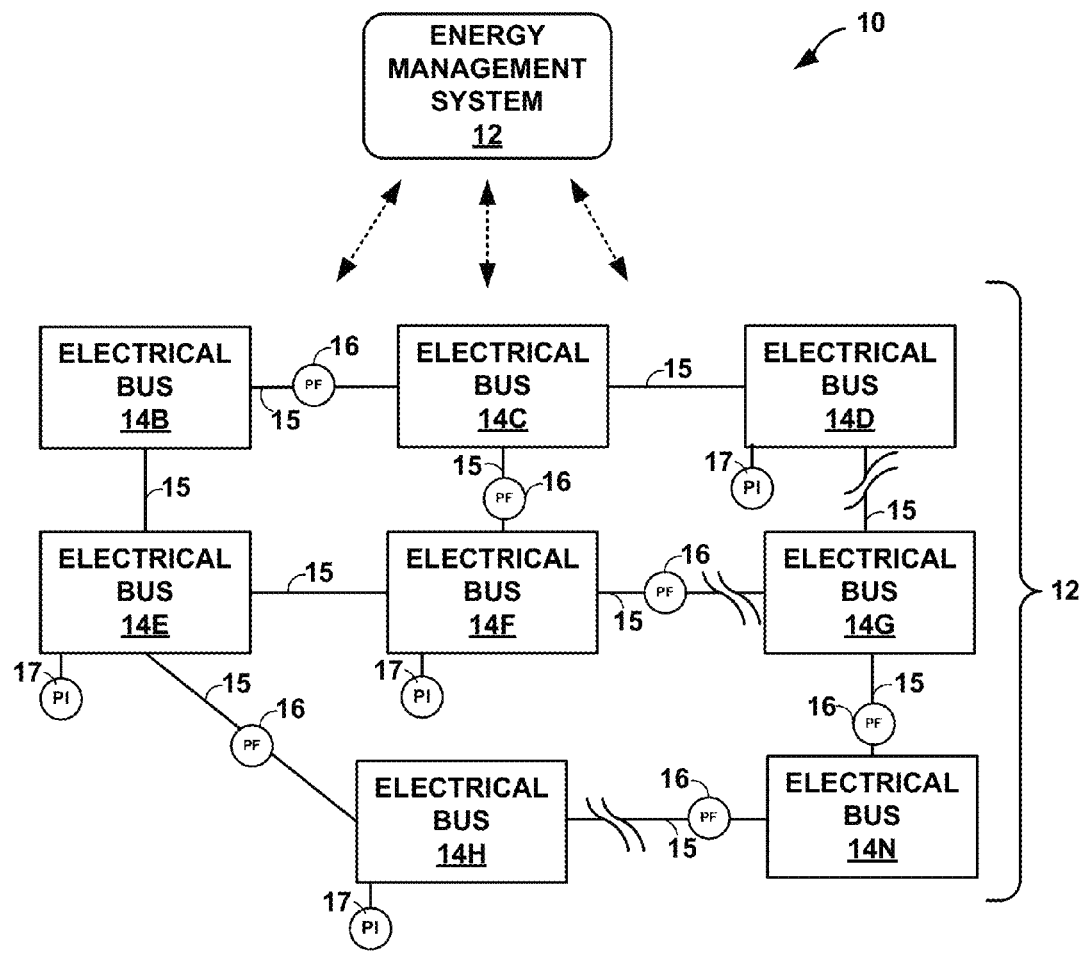
FIG. 1 illustrates and example system that implements techniques described herein to estimate system state of electrical power busses within large-scale power grids.

FIG. 1 illustrates and example system 10 that implements techniques described herein to estimate system state of electrical power busses within large-scale power grids, such as power grid 12. In the example of FIG. 1, power grid 12 includes a plurality of N electrical buses 14 interconnected by transmission lines 15. Power flow meters 16 and power injection meters 17 are example measurement units that provide measurement for various system variables at a selected subset of transmission lines 15 within power grid 12. Power flow meters 16 and power injection meters 17 transmit the measurements to energy management system 12 for estimation of system state variables, such as complex bus voltages, at all transmission lines for electrical buses 14 throughout power grid 12. For example, power flow meters 15 measure how much power is flowing on a given transmission line 15. Power flow meters 16 measure how much power generation/load is currently occurring at each corresponding electric bus 14. In some examples, as further explained below, multi-area state estimation may be performed in a distributed fashion for multiple interconnected "subgrids." In addition, robust techniques are described that are resilient to outlying measurements and/or adversarial cyber-attacks.

The present disclosure leverages physical properties of AC power systems in order to develop polynomial-time SE algorithms, which offer the potential to find a globally optimal state estimate. Challenged by the nonconvexity in SE, the approaches herein may make use of a technique called semidefinite relaxation (SDR) to relax an otherwise nonconvex problem to a semidefinite programming (SDP) one. As described herein, SDR may provide a versatile optimization technique for solving nonconvex problems associated with state estimation of the bus voltages at each of electrical buses 14.

Energy management system 12 may comprise one or more controllers or computers programmed to take certain action in response to computing estimates for the electrical characteristic for all of buses 14 within power grid 12. For example, energy management system 12 may control operation of one or more of electrical buses 14 based on the computed to estimates. As another example, energy management system 12 may generate reports that specify power consumption at each of buses 14 within power grid 12 based on the computed estimates. Energy management system 12 may output communications to automatically update an accounting system to charge respective operators of each power buses 14 based on the computed estimates. Energy management system 12 may generate alerts based on the computed estimates.

As used herein, the state estimation (SE) task for power systems refers to the process of acquiring estimates of system variables, such as the voltage phasors at all buses 14, in the power grid 12. This is inherently a nonconvex problem giving rise to many local optima due to the nonlinear coupling present among legacy meter measurements provided by some of power flow meters 16. Specifically, SE falls under the class of nonlinear (weighted) least-squares (LS) problems, for which the Gauss-Newton method is the "workhorse" solver. This iterative scheme has also been reckoned as the algorithmic foundation of SE. Using the Taylor expansion around an initial point, the Gauss-Newton method approximates the nonlinear LS cost by a linear one, whose minimum is used for the ensuing iteration. Since this iterative procedure is in fact related to gradient descent solvers for nonconvex problems, it inevitably faces challenges pertaining to sensitivity of the initial guess and convergence issues. Without guaranteed convergence to the global optimum, existing variants have asserted numerical stability, but are restrained to improving the linearized LS cost per iteration. Linear state measurements offered by synchronized phasor measurement units (PMUs) can be incorporated as some of power flow meters 16. However, limited PMU deployment may, in some implementations, confine SE to mostly rely on the nonlinear legacy meter measurements, and its companion Gauss-Newton iterative methods.

A power transmission network (power grid 12) typically includes a plurality of AC power subsystems 14 (referred to herein as electrical buses) that are interconnected to distribute electrical power. A power grid of such subsystems is typically managed by one or more regional transmission organizations (RTOs) or independent system operators (ISOs). Consider power grid 12 of FIG. 1 with N electrical buses denoted by the set of nodes $\mathcal{N} := \{1, \ldots, N\}$, and transmission lines 15 represented by the set of edges $\mathcal{E} := \{(n,m)\} \subseteq \mathcal{N} \times \mathcal{N}$ To estimate the complex voltage $V_n$ at each bus $n \in \mathcal{N}$, measurements are taken for a subset of the following system variables:

$P_n(Q_n)$: the real (reactive) power injection at bus n (negative if bus n is connected to a load);

$P_{mn}(Q_{mn})$: the real (reactive) power flow from bus m to bus n; and $|V_n|$: the voltage magnitude at bus n.

Compliant with the well-known AC power flow model, these measurements are nonlinearly related with the power system state of interest, namely the voltage vector $v := [V_1, \ldots, V_N]^T \in \mathbb{C}^N$. To specify this relationship, similarly collect the injected currents of all buses in $i := [I_1, \ldots, I_N]^T \in \mathbb{C}^N$, and let $Y \in \mathbb{C}^{N \times N}$ represent the grid's symmetric bus admittance matrix. Kirchoff's law in vector-matrix form dictates $i = Yv$, where the (m,n)-th entry of Y is given by $$Y_{mn} := \begin{cases} -y_{mn}; & \text{if } (m;n) \in \mathcal{E} \\ \bar{y}_{nn} + \sum_{v \in \mathcal{N}_n} y_{nv}; & \text{if } m = n \\ 0; & \text{otherwise} \end{cases} \quad (1)$$

with $y_{mn}$ denoting the line admittance between buses m and n, $\bar{y}_{nn}$ bus n's admittance to the ground, and $\mathcal{N}$ the set of all buses linked to bus n through transmission lines.

Letting $\bar{y}_{mn}$ stand for the shunt admittance at bus m associated with the line (m,n), the current flowing from bus m to n is $I_{mn} = \bar{y}_{mn} V_m + y_{mn}(V_m - V_n)$. In addition to currents, the AC power flow model further asserts that the apparent power injection into bus n is given by $P_n + jQ_n = V_n I_n^*$, while the apparent power flow from bus m to bus n by $P_{mn} + jQ_{mn} = V_m I_n^*$. Finally, expressing the squared bus voltage magnitude as $|V_n|^2 = V_n I_n^*$, it is clear that all measurable quantities listed earlier are nonlinearly (in fact quadratically) related to the state v.

Collect these (possibly noisy) measurements in the L×1 vector $z := [\{\check{P}_n\}_{n \in N_P}, \{\check{Q}_n\}_{n \in N_Q}, \{\check{P}_{mn}\}_{(m,n) \in \mathcal{E}_P}, \{\check{Q}_{mn}\}_{(m,n) \in \mathcal{E}_Q}, \{|\check{V}_n|^2\}_{n \in N_V}]^T$, where the check mark differentiates measured values from the error-free variables. For consistency with other measurements, the squared magnitude $|V_n|^2$ is considered from now on. This is possible by adopting the model $|\check{V}_n| = |V_n| + \epsilon_V$, where $\epsilon_V$ is zero-mean Gaussian with small variance $\sigma_V^2$, to an approximate model for the squared magnitude; namely, $|\check{V}_n|^2 \approx |V_n|^2 + \epsilon'_V$, where $\epsilon'_V$ has variance $4|\check{V}_n|^2 \sigma_V^2$. The l-th entry of z can be written as $z_l = h_l(v) + \epsilon_l$, where $h_l(\cdot)$ denotes the nonlinear relationship specified according to the aforementioned AC power flow equations. The zero-mean Gaussian error $\epsilon_l$ at the l-th meter is assumed independent across meters with variance $\sigma_l^2$. Due to the independence among errors, the maximum-likelihood (ML) criterion for estimating v boils down to the weighted least-squares (WLS) one, yielding the optimal state estimator as $$\hat{v} := \arg\min_{v} \sum_{l=1}^{L} w_l [z_l - h_l(v)]^2, \quad (2)$$

where $w_l := 1/\sigma_l^2 \forall l$. The nonlinear WLS SE formulation in (2) is clearly nonconvex.

The Gauss-Newton iterative solver for nonlinear WLS problems has been widely used for SE. Using Taylor's expansion around a given starting point, the pure form of Gauss-Newton methods approximates the cost in (2) with a linear WLS one, and relies on its minimizer to initialize the subsequent iteration. This iterative procedure is closely related to gradient descent algorithms for solving nonconvex problems, which are known to encounter two issues: i) sensitivity to the initial guess; and ii) convergence concerns.

Typical WLS-based SE iterations start with a flat voltage profile, where all bus voltages are initialized with the same real number. Unfortunately, this may not guarantee convergence to the global optimum. Existing variants have asserted improved numerical stability, but they are all limited to improving the approximate WLS cost per iteration. Recently, due to rapid developments in PMU technology, SE has benefited greatly by including the synchrophasor data, which adhere to linear measurement models with respect to (wrt) the unknown v. Nonetheless, challenges emerging from the nonlinearity of legacy measurements must be addressed in the resultant PMU-aided SE methods.

In summary, one challenge so far has been to develop a solver attaining or approximating the global optimum at polynomial-time complexity. The next section addresses this challenge by appropriately reformulating SE to apply the semidefinite relaxation (SDR) technique.

Consider first expressing each quadratic measurement in z linearly in terms of the outer-product matrix $V := t_n^a$. To this end, let $\{e_n\}_{n=1}^{N}$ denote the canonical basis of $\mathbb{R}^N$, and define the following admittance-related matrices $$Y_n := e_n e_n^T Y \quad (3a)$$

$$Y_{mn} := (\bar{y}_{mn} + y_{mn}) e_m e_m^T - y_{mn} e_m e_n^T \quad (3b)$$

and their related Hermitian counterparts $$H_{P,n} := \frac{1}{2}(Y_n + Y_n^H), \quad H_{Q,n} := \frac{j}{2}(Y_n - Y_n^H) \quad (4a)$$

$$H_{P,mn} := \frac{1}{2}(Y_{mn} + Y_{mn}^H), \quad H_{Q,mn} := \frac{j}{2}(Y_{mn} - Y_{mn}^H) \quad (4b)$$

$$H_{V,n} := e_n e_n^T. \quad (4c)$$

Using these definitions, the following lemma can be proved to establish a linear model in the complex V.

Lemma 1:

All error-free measurement variables are linearly related with the outer-product V as $$P_n = Tr(H_{P,n} V), \quad Q_n = Tr(H_{Q,n} V) \quad (5a)$$

$$P_{mn} = Tr(H_{P,mn} V), \quad Q_{mn} = Tr(H_{Q,mn} V) \quad (5b)$$

$$|V_n|^2 = Tr(H_{V,n} V). \quad (5c)$$

Thus, the noisy meter measurement $z_l$ can be written as $$z_l = h_l(v) + \epsilon_l = Tr(H_l V) + \epsilon_l \quad (6)$$

where $H_l$ is a Hermitian matrix specified in accordance with (4a)-(4c).

Proof: To establish (5a), use the injected power flow equation, and successively Kirchoff's law and (3a) to obtain $P_n + jQ_n = V_n t_n^a = (t_n^a I_n) t_n^a = (t_n^a e_n e_n^T i) t_n^a = (t_n^a Y_n v) t_n^a = t_n^a t_n^a v = Tr(t_n^a V)$. Hence, $P_n$ and $Q_n$ are related to V using the real and imaginary parts of $Y_n^H$, respectively, as asserted in (5a). Likewise, (5b) follows after replacing with the line power flow equation and (4b), while $|V_n|^2$ is naturally the (n, n)-th entry of V as in (5c).

Lemma 1 yields the following equivalent reformulation of (2)

$$\hat{V}_1 := \arg\min_{V \in \mathbb{C}^{N \times N}} \sum_{l=1}^{L} w_l [z_l - Tr(H_l V)]^2 \quad (7a)$$

$$\text{s.to } V \succeq 0, \text{ and } \text{rank}(V) = 1 \quad (7b)$$

where the positive semi-definiteness and rank constraints jointly ensure that for any V admissible to (7b), there always exists a $v \in \mathbb{C}^N$ such that $V = t_n^a$.

Albeit the linearity between $z_l$ and V in the new formulation (7), nonconvexity is still present in two aspects: i) the cost in (7a) has degree 4 wrt the entries of V; and ii) the rank constraint in (7b) is nonconvex. Aiming for an SDP formulation of (7), Schur's complement lemma can be leveraged to convert the summands in (7a) to a linear cost over an auxiliary vector $\chi \in \mathbb{R}^L$. Specifically, with $w := [w_1, \ldots, w_L]^T$ and likewise for $\chi$, consider the second SE reformulation as:

$$\{\hat{V}_2, \hat{\chi}_2\} := \arg\min_{V, \chi} \sum_{l=1}^{L} w_l \chi_l = \arg\min_{V, \chi} w^T \chi \quad (8a)$$

$$\text{s.to } V \succeq 0, \text{ and } \text{rank}(V) = 1 \quad (8b)$$

$$\begin{bmatrix} -\chi_l & z_l - Tr(H_l V) \\ z_l - Tr(H_l V) & -1 \end{bmatrix} \preceq 0 \, \forall l. \quad (8c)$$

Proposition 1:

All three nonconvex optimization problems in (2), (7), and (8) solve an equivalent SE problem under the AC flow model. For the optima of these problems, it holds that $$\hat{V}_1 = \hat{V}_2 = \hat{v}\hat{v}^H$$

and $\hat{\chi}_{2,l} = [z_l - Tr(H_l \hat{V}_2)]^2 \forall l$. (9)

Proof:

First, notice that the outer-product $\hat{v}\hat{v}^H$ is feasible for (7). Expressing the rank-1 matrix as $\hat{V}_1 = \hat{v}_1 \hat{v}_1^H$ renders the complex $\hat{v}_1$ also feasible for (2). As Lemma 1 establishes the equivalence between the costs in (2) and (7a), their solutions can be related henceforth.

For the equivalence between (7) and (8), Schur's complement lemme for (8c) ensures that $\chi_l \geq [z_l - Tr(H_l V)]^2 \forall l$. Since (8a) minimizes a positively weighted sum of $\{\chi_l\}$, the equality is further guaranteed at the optimum; i.e., $\hat{\chi}_{2,l} = [z_l - Tr(H_l \hat{V}_2)]^2 \forall l$. Substituting this back to (8a) shows that $\hat{V}_1$ and $\hat{V}_2$ achieve the same minimum cost, which completes the proof.

Remark 1 (Line Current Magnitude Measurements).

For certain distribution-level SE problems, line current magnitude measurements $|\check{I}_{mn}|$ are also available. It is worth pointing out that all SE reformulations can also handle this type of measurements. Since $I_{mn}$ is linear in v, its magnitude squared $|I_{mn}|^2$ will be quadratic in v, and likewise linear in V as in (6). Hence, the equivalence in Proposition 1 and the ensuing analysis apply even with current magnitude measurements, which for brevity are henceforth omitted.

Convexifying SE Via SDR

Proposition 1 established the relevance of the novel SE formulation (8), which is still nonconvex though, due to the rank-1 constraint. Fortunately, problem (8) is amenable to the SDR technique, which amounts to dropping the rank constraint and has well-appreciated merits as an optimization tool. The SDR technique has also recently provided new perspectives for a number of nonconvex problems in the field of signal processing and communications, thanks to its provable performance guarantees and implementation advantages. The contribution here consists in permeating the benefits of this powerful optimization tool to estimating the state of AC power systems. In the spirit of SDR, relaxing the rank constraint in (8b) leads to the following SDP $$\{\hat{V}, \hat{\chi}\} := \arg\min_{V} w^T \chi \qquad (10a)$$

$$\text{s.to } V \succeq 0 \qquad (10b)$$

$$\begin{bmatrix} -\chi_l & z_l - Tr(H_l V) \\ z_l - Tr(H_l V) & -1 \end{bmatrix} \preceq 0 \ \forall \ l. \qquad (10c)$$

SDR endows SE with a convex SDP formulation for which efficient schemes are available to obtain the global optimum using, e.g., the interior-point solver SeDuMi. The worst-case complexity of this SDP problem is $O(L^4 \sqrt{N} \log(1/\epsilon))$ for a given solution accuracy $\epsilon > 0$. For typical power networks, L is in the order of N, and thus the worst-case complexity becomes $O(N^{4.5} \log(1/\epsilon))$. In addition, it is possible to leverage the special problem structure to further reduce complexity. Indeed, all matrices in (4) are markedly sparse. For example, only the (n,n)-th entry of $H_{V,n}$ is non-zero. A closer look reveals that all $\{H_l\}$ matrices have non-zero entries only at their diagonal entries, and those (m,n)-th off-diagonal ones that correspond to transmission lines in $\mathcal{E}$. This can be used to exploit the so-called "chordal" data structure of V, which has led to major computational savings for solving the SDR-based OPF problem. Another special structure relates to the low rank of $\{H_l\}$ matrices, which could greatly simplify the Schur complement matrix computation step of interior-point methods.

Nonetheless, the SDP problem (10) is only a relaxed version of the equivalent SE in (8); hence, its solution $\hat{V}$ may have rank greater than 1, which makes it necessary to recover a feasible estimate $\hat{v}$ from $\hat{V}$. This is possible by eigen-decomposing $\hat{V} = \sum_{i=1}^{r} \lambda_i u_i u_i^H$, where $r := \text{rank}(\hat{V})$, $\lambda_1 \geq \ldots \geq \lambda_r > 0$ denote the positive ordered eigenvalues, and $\{u_i \in \mathbb{C}^N\}_{i=1}^r$ are the corresponding eigenvectors. Since the best (in the minimum-norm sense) rank-one approximation of $\hat{V}$ is $\lambda_1 u_1 u_1^H$, the state estimate can be chosen equal to $\hat{v}(u_1) := \sqrt{\lambda_1} u_1$. Besides this eigenvector approach, randomization offers another way to extract an approximate SE vector from $\hat{V}$, with quantifiable approximation accuracy. The basic idea is to generate multiple Gaussian distributed random vectors $v \sim \mathcal{CN}(0, \hat{V})$, and pick the one with the minimum WLS cost. Note that although any vector v is feasible for (2), it is still possible to decrease the minimum achievable cost by rescaling to obtain $\hat{v}(v) = \hat{c} v$, where the optimal weight can be chosen as the solution to the following convex problem as $$\hat{c} = \arg\min_{c > 0} \sum_{l=1}^{L} w_l [z_l - c^2 v^H H_l v]^2 = \sqrt{\frac{\sum_{l=1}^{L} w_l z_l v^H H_l v}{\sum_{l=1}^{L} w_l (v^H H_l v)^2}}. \qquad (11)$$

Remark 2 (Reference Bus).

For power system SE, the reference bus convention is adopted, and the corresponding bus voltage angle is set to 0. As all measurements in (6) are quadratically related to v, the outer-product $(e^{j\Theta} v)(e^{j\Theta} v)^H = vv^H$ remains invariant to phase rotation $\Theta \in [-\pi, \pi]$. To account for this, once an estimate $\hat{v}$ is recovered, it can be rotated by multiplying with $\hat{v}_{ref}^H / |\hat{v}_{ref}|$, where $\hat{v}_{ref}$ denotes the estimated reference-bus voltage.

Dual Equivalence

This section relates the relaxed and unrelaxed SE problems through the equivalence of their dual problems. Consider the dual of (10) by defining the Lagrange multiplier matrix associated with the l-th inequality in (10c) as $$\mu_l := \begin{bmatrix} \mu_{l,0} & \mu_{l,1} \\ \mu_{l,1} & \mu_{l,2} \end{bmatrix} \succeq 0. \qquad (12)$$

Using (12), the Lagrangian corresponding to (10) becomes:

$$\mathcal{L}(V, \chi, \{\mu_l\}) := w^T \chi + \sum_{l=1}^{L} Tr \left\{ \begin{bmatrix} -\chi_l & z_l - Tr(H_l V) \\ z_l - Tr(H_l V) & -1 \end{bmatrix} \mu_l \right\} \qquad (13)$$

$$= \sum_{l=1}^{L} \{(w_l - \mu_{l,0})\chi_l - \mu_{l,2} + 2[\mu_{l,1} z_l - Tr(\mu_{l,1} H_l V)]\}.$$

The dual problem amounts to maximizing over $\mu_l \succeq 0$, a cost equal to the minimum Lagrangian $L(V, \chi, \{\mu_l\})$ over both $\chi$ and $V \succeq 0$. This minimum is attained when $\omega_l - \mu_{l,0} = 0$ and $-2 \sum_{l=1}^{L} \mu_{l,1} H_l \succeq 0$, which leads to the dual problem formulation as $$\{\hat{\mu}_l\}_{l=1}^{L} := \arg\min_{\mu_l} \sum_{l=1}^{L} (\mu_{l,2} - 2\mu_{l,1} z_l) \qquad (14a)$$

$$\text{s.to } \mu_l = \begin{bmatrix} w_l & \mu_{l,1} \\ \mu_{l,1} & \mu_{l,2} \end{bmatrix} \succeq 0, \forall l \qquad (14b)$$

$$A := 2 \sum_{l=1}^{L} \mu_{l,1} H_l \preceq 0. \qquad (14c)$$

Proposition 2:

The SDP problem in (14) is the dual of both the SE in (8) and the SDR-based SE in (10). Strong duality holds between (14) and (10), while the primal variable $V \succeq 0$ corresponds to the Lagrange multiplier associated with (14c).

Proof:

Given how Tr(AV) appears in the Lagrangian L, it follows that V is the Lagrange multiplier for the dual constraint $A \preceq 0$ in (14c). Strong duality between these two convex problems holds because the primal SE problem admits a strictly feasible V=I and $\chi_l = (z_l - Tr(H_l))^2 + 1 \ \forall l$. To show that (14) is also the dual of the original problem in (8), recall that (8b)

is equivalent to having $V=vv^{\mathcal{H}}$ for some v. Therefore, the corresponding Lagrangian of the SE problem (8) can be obtained by substituting V's outer-product form into (13). Interestingly, the minimum of this new Lagrangian over $\chi$ and v is no different from the one in (13), and thus the same dual problem in (14) follows.

The strong duality asserted by Proposition 2 implies that the SDR-based SE problem (10) is also the dual of (14), and thus Lagrangian bidual of the original SE (8). Hence, apart from the rank relaxation interpretation in the primal domain, this provides another interpretation based on the Lagrangian dual equivalence. Additional complexity reduction is envisioned from this dualization. The dual SE problem (14) entails 2 L unknown variables, where for typical power networks the number of measurements L is in the order of the number of lines $|\mathcal{E}|$, which is of order N. Compared to the N×N complex matrix V in the primal SDP (10), the dual one has considerably less variables to optimize over.

PMU-Aided SDR-Based SE

Recent deployment of PMUs suggests complementing with PMU data, the measurements collected by legacy meters to perform SE. Compared to legacy measurements, PMUs provide synchronous data that are linear functions of the state v. If bus m is equipped with a PMU, then its voltage phasor $V_m$ and related current phasors $\{I_{mn}\}_{n\in\mathcal{N}_m}$ are available to the control center with high accuracy. Hence, with adequate number of PMUs and wisely chosen placement buses, SE using only PMU data boils down to estimating a linear regression coefficient vector for which a batch WLS solution is available in closed form. However, installation and networking costs involved allow only for limited penetration of PMUs in the near future. This means that SE may need to be performed using jointly legacy meters and PMU measurements.

To this end, let $\zeta_m = \Phi_m v + \epsilon_m$ collect the noisy PMU data at bus m, where the linear regression matrix $\Phi_m$ is constructed in accordance with the bus index m and line admittances, while $\epsilon_m$ denotes the PMU measurement noise, assumed to be complex zero-mean Gaussian distributed with covariance $2\check{\sigma}_m^2 I$, independent across buses and from the legacy meter noise terms $\{\epsilon_l\}$. The SE task now amounts to estimating v given both z and $\{\zeta_m\}_{m\in\mathcal{P}}$ where $\mathcal{P}\subseteq\mathcal{N}$ denotes the PMU-instrumented set of buses. Hence, the ML-optimal WLS cost in (2) must be augmented with the log-likelihood induced by PMU data, as $$\hat{v} := \arg\min_{v} \sum_{l=1}^{L} w_l [z_l - h_l(v)]^2 + \sum_{m\in\mathcal{P}} \omega_m \|\zeta_m - \Phi_m v\|_2^2 \quad (15)$$

where $\omega_m := 1/\check{\sigma}_m^2 \ \forall m \in \mathcal{P}$. The augmented SE problem (15) is still nonconvex due to the quadratic dependence of legacy measurements in the wanted state v.

Existing SE methods that account for PMU measurements can be categorized in two groups. The first one includes the so-termed hybrid SE approaches which utilize both PMU and legacy measurements in a WLS solver via iterative linearization. Depending on the number of PMUs, the state can be either expressed using polar coordinates (similar to traditional WLS-based SE), or by rectangular coordinates (as the notation v here). The polar representation is preferred when legacy measurements are abundant, because it requires minor adaptations of the existing WLS-based SE. On the other hand, the polar representation is less powerful when it comes to exploiting the linearity of PMU measurements. With full penetration of PMUs in the future, the rectangular representation is expected to grow in popularity, especially if full observability can be ensured by the sole use of PMU measurements.

An alternative approach to including PMU data is through sequential SE, which entails two steps. The WLS-based SE is performed first based only on legacy measurements. This state estimates serve the role of linear "pseudo-measurements" for the subsequent step together with PMU measurements. The post-processing involves linear models only, and is efficiently computable. Clearly, sequential SE requires no modifications of existing SE modules, but loses the optimality offered by joint estimation. More severely, if the traditional SE based only on legacy measurements fails to converge to a global optimum, the post-processing including PMU data is unlikely to improve estimation accuracy.

Since both of these options for including PMU data suffer from the nonconvexity present with legacy measurements, the SDR technique is again well motivated to convexify the augmented SE to $$\{\hat{X}, \hat{\chi}\} := \arg\min_{X,\chi} w^T \chi + \sum_{m\in\mathcal{P}} \omega_m [Tr(\Phi_m^{\mathcal{H}} \Phi_m V) - 2\mathrm{Re}(\zeta_m^{\mathcal{H}} \Phi_m v)] \quad (16a)$$

$$\text{s.to } X = \begin{bmatrix} V & v \\ v^{\mathcal{H}} & 1 \end{bmatrix} \succeq 0, \quad (16b)$$

$$\begin{bmatrix} -\chi_l & z_l - Tr(H_l V) \\ z_l - Tr(H_l V) & -1 \end{bmatrix} \preceq 0 \forall l. \quad (16c)$$

Similar to the SDR-based SE problem (10) with the additional constraint rank(X)=1, the positive semi-definiteness of X can ensure $V=v_n^{\mathcal{H}}$. Substituting the latter into (16), and following the proof of Proposition 1 leads to the equivalence of rank-constrained (16) with the augmented WLS in (15). The SDP problem here also offers the advantages of (10), in terms of polynomial complexity and dual equivalence. From the solution $\hat{X}$, either eigenvector approximation or randomization can be employed to generate vectors of length N+1. Using the first N entries of any such vector, a feasible state estimate can be formed by proper rescaling. With linear PMU measurements, the voltage angle ambiguity is no longer present, and the rescaling factor $\hat{c}^*$ can be found by solving $$\hat{c}^* = \arg\min_{c\in\mathbb{C}} \sum_{l=1}^{L} \omega_l [z_l - |c|^2 v^{\mathcal{H}} H_l v]^2 + \sum_{m\in\mathcal{P}} \omega_m \|\zeta_m - c\Phi_m v\|_2^2. \quad (17)$$

This is a fourth-order polynomial minimization problem and numerically solvable. It is often the case that the PMUs have much higher accuracy compared to legacy meters, and their corresponding weights are much larger, which leads to $\omega_l \gg w_l$. Hence, it suffices to minimize only the dominant second summand in (17), and efficiently approximate the solution $$\hat{c}^* \approx \left(\sum_{m\in\mathcal{P}} \omega_m \zeta_m^{\mathcal{H}} \Phi_m v\right) \Big/ \left(\sum_{m\in\mathcal{P}} \omega_m \|\Phi_m v\|_2^2\right).$$

This approximation will be used in the numerical tests of the ensuing section.

Numerical Tests

Figure 2:
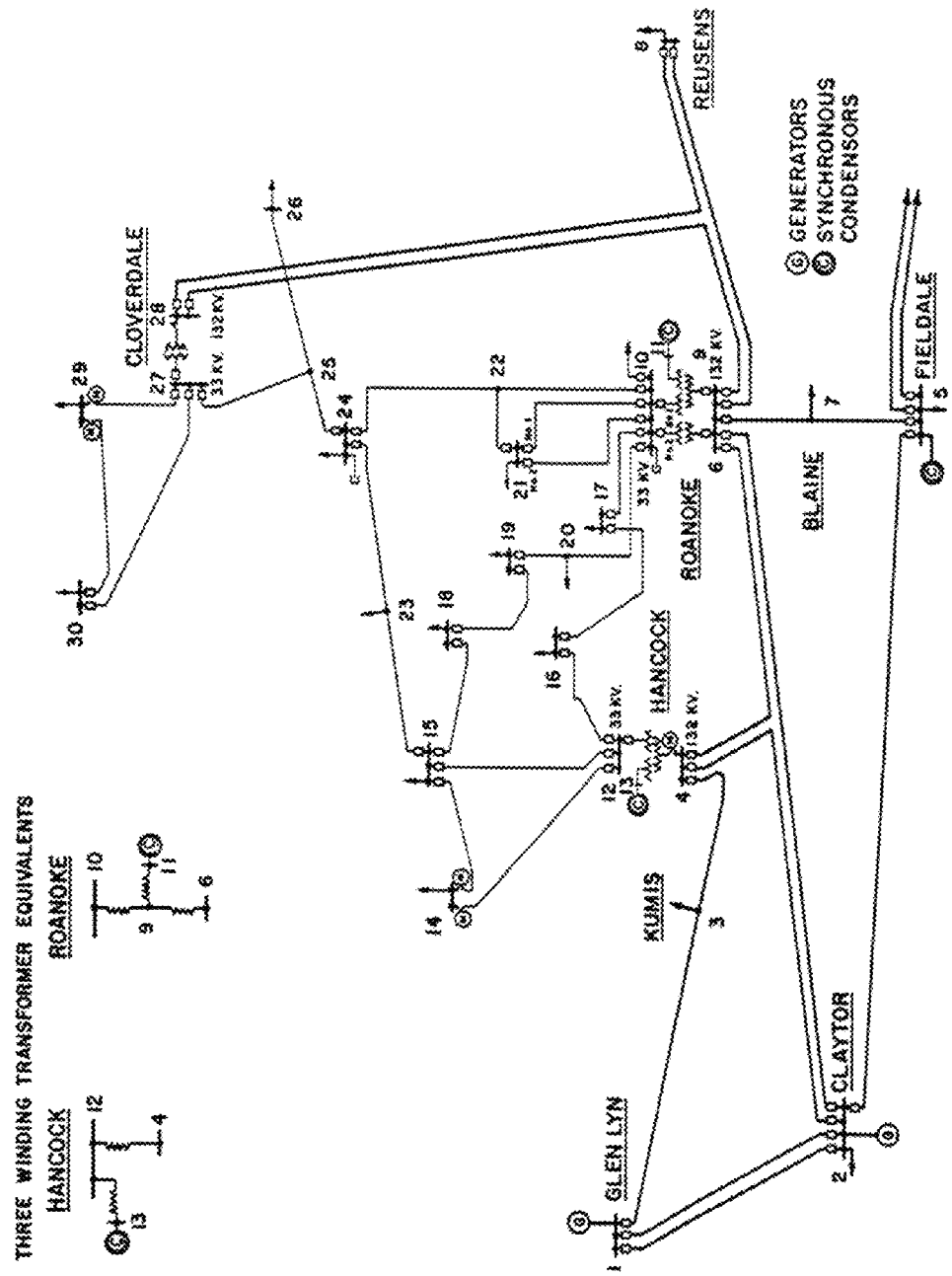
FIG. 2 illustrates an IEEE 30-bus system commonly used for power system testing.

FIG. 2 illustrates an IEEE 30-bus system commonly used for power system testing. The SDR-based SE techniques described herein were tested using the IEEE 30-bus system with 41 transmission lines, and compared to existing WLS methods that are based on Gauss-Newton iterations. Different legacy meter or PMU placements and variable levels of voltage angles were considered. The software toolbox MATPOWER was used to generate the pertinent power flow and meter measurements. In addition, its SE function was adapted to realize the WLS Gauss-Newton iterations. The iterations terminated either upon convergence, or, once the condition number of the approximate linearization exceeds $10^8$, which flags divergence of the iterates. To solve the (augmented) SDR-based SE problems, the MATLAB-based optimization modeling package CVX was used, together with the interior-point method solver SeDuMi.

Test Case 1:

The real and reactive power flows along all 41 lines were measured, together with voltage magnitudes at 30 buses. Independent Gaussian noise corrupts all measurements, with $\sigma_l$ equal to 0.02 at power meters, and 0.01 at voltage meters. Except for the reference bus phasor $V_{ref}=1$, each bus had its voltage magnitude Gaussian distributed with mean 1 and variance 0.01, and its voltage angle uniformly distributed over $[-\theta, \theta]$. For three choices, namely $\theta=0.3\pi$, $0.4\pi$, and $0.5\pi$, the empirical estimation errors $\|v-\hat{v}\|_2$ were averaged over 500 Monte-Carlo realizations for the SDR approach and the WLS one using three different initializations, as listed in Table I. The percentage of realizations that the iterative WLS method converges is also given in parentheses. The SDR estimator was recovered from the SDR-based SE solution $\hat{V}$, by picking the minimum-cost vector over the eigenvector solution and 50 randomization samples. The first WLS estimator, termed WLS/FVP, corresponds to the WLS solution initialized by the flat-voltage profile (FVP) point; that is, the one using the all-one vector as an initial guess. For a better starting point, the second WLS/DC one was obtained by initializing the voltage angles using the DC model SE, and the magnitudes using the corresponding meter measurements. To gauge the SDR approach's near-optimal performance with respect to the global solution, the SDR estimator was further used to initialize the WLS iterations, and the abbreviation used for this estimator is WLS/SDR.

TABLE I

ESTIMATION ERROR WITH % OF CONVERGENCE FOR TEST CASE 1.

| θ | SDR | WLS/FVP | WLS/DC | WLS/SDR |
|---|---|---|---|---|
| 0.3π | 0.070 | 0.097 (98.6%) | 0.042 (100%) | 0.042 (100%) |
| 0.4π | 0.081 | 0.593 (88.6%) | 0.255 (97.2%) | 0.044 (100%) |
| 0.5π | 0.088 | 2.228 (68.6%) | 1.161 (88.0%) | 0.047 (100%) |

Table I clearly shows that the DC model based SE provides a much better initialization compared to the FVP one, in terms of smaller estimation error and higher probability of convergence. When the actual voltage angles are small ($\theta=0.3\pi$), the WLS linear approximation is quite accurate with either the FVP or the DC model based initialization, and thus convergence to the global optimum can be guaranteed. Especially for the WLS/DC with $\theta=0.3\pi$, the empirical error 0.042 can be considered as the benchmark estimation error achieved for such meter placements and noise levels. As $\theta$ increases however, the nonlinearity in the measurement model is responsible for the performance degradation exhibited by the WLS/FVP and WLS/DC estimators. Interestingly, estimation accuracy of the SDR estimator is still competitive to the benchmark and comes close to the global optimum. With any choice of $\theta$, the WLS/SDR estimator is always convergent and attains the benchmark accuracy 0.042 within numerical accuracy. This suggests that the SDR-based estimator comes with numerically verifiable approximation bounds relative to the global optimum. Further evidence to this effect is provided by the empirical voltage angle and magnitude errors per bus.

FIGS. 3A1, 3A2, 3B1 and 3B2 compare estimation errors in voltage magnitudes and angles between SDR and WLS solvers at different buses for Test Case 1. With $\theta=0.3\pi$, FIGS. 3A1 and 3A2 demonstrate that the SDR estimator exhibits error variation similar to both WLS/DC and WLS/SDR, which is roughly twice that of these two optimal schemes. However, as $\theta$ increases to $0.4\pi$, FIGS. 3B1 and 3B2 illustrate that the WLS/DC estimator blows up due to possible divergence especially in the angle estimates, while both the SDR and WLS/SDR show comparable accuracy as well as analogous performance. This test case numerically supports the near-optimal performance of the proposed SDR-based SE algorithm.

Test Case 2:

Here 19 line flow meters and 15 bus injection meters are used, together with 30 voltage magnitude meters. Although full observability is ensured, a certain number of lines is not directly observed. Thus, quadratic coupling of measurements affects SE in those indirectly observed lines and leads to performance degradation, as confirmed by Table II. The relative performance and convergence probability among different estimators for various choices of $\theta$ follow the trends of Test Case 1, but the placement here yields a larger benchmark estimation error around 0.11. As a result, the impact of initialization is more significant here, as for $\theta=0.3\pi$ the WLS/DC iterations diverge in nearly 10% of realizations.

FIGS. 4A1, 4A2, 4B1 and 4B2 are graphs that compare estimation errors in voltage magnitudes and angles between SDR and WLS solvers for Test Case 2. A close look at the error plots in FIGS. 4B1 and 4B2 reveal that the estimation errors at buses 1 through 8 are more or less similar to the optimal ones, especially for the angle errors. Hence, divergence of the WLS/DC estimator due to insufficient direct flow measurements affects the estimates at buses 9 through 30. Nonetheless, the SDR-based estimator still offers near-optimal performance relative to the benchmark WLS/SDR one for any $\theta$.

TABLE II

ESTIMATION ERROR WITH % OF CONVERGENCE FOR TEST CASE 2.

| θ | SDR | WLS/FVP | WLS/DC | WLS/SDR |
|---|---|---|---|---|
| 0.2π | 0.174 | 0.265 (96.6%) | 0.148 (99.4%) | 0.115 (100%) |
| 0.3π | 0.203 | 1.759 (68.6%) | 0.653 (91.4%) | 0.109 (100%) |
| 0.4π | 0.247 | 3.521 (47.0%) | 2.141 (66.0%) | 0.104 (100%) |

Figure 5A:
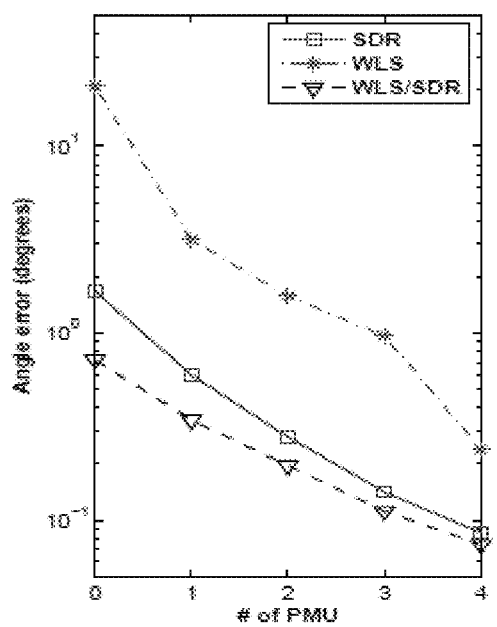
FIGS. 5A and 5B are graphs that compare estimation errors between SDR and WLS solvers versus the number of PMUs for angle estimates and magnitude estimates.
Figure 5B:
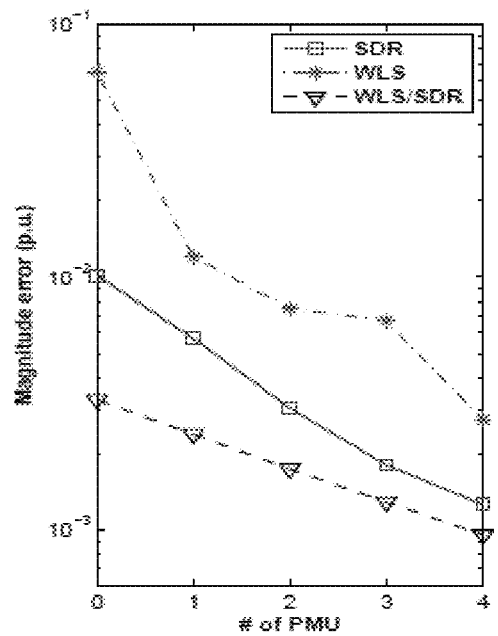

Test Case 3:

To tackle the issue of insufficient direct measurements in Test Case 2, PMUs are deployed to enhance the SE performance offered by legacy measurements with θ=0.4π. The PMU meter noise level is set to $\hat{\sigma}_m$=0.002 at all buses. The greedy approach using the A-optimal placement of PMUs selects the four buses from {10, 12, 27, 15} to be equipped with PMUs sequentially. Since the WLS iterations with only legacy measurements are not guaranteed to converge, as verified by Table II, the sequential approach of including PMU data does not lead to improved convergence. Hence, the joint WLS-based SE approach using polar representation of the state is adopted for comparison. The WLS initialization combines the linear estimates at those observable buses based on the PMU measurements, with the DC model angle estimates mentioned earlier. The SDR estimator is obtained from the solution $\hat{X}$ in (16) with the approximate rescaling factor $\hat{c}^*$ based only on PMU measurements, which also serves as initial guess to obtain the WLS/SDR estimator. The empirical estimation errors for 0 to 4 PMUs are listed in Table III, where the PMU absent results are repeated from Table II. As the number of PMUs increases, the estimation accuracy as well as the probability of convergence improve for the WLS estimator. Still, there is a considerable gap relative to the other two estimators based on the SDR solution. Using more PMUs the SDR estimator approximates better the optimal WLS/SDR one, with the approximation gap coming very close to 1. This is illustrated in FIGS. 5A and 5B, which are graphs that compare estimation errors between SDR and WLS solvers versus the number of PMUs for angle estimates and magnitude estimates. In FIGS. 5A and 5B, empirical angle and magnitude errors in the logarithmic scale are averaged over all 30 buses and plotted versus the number of PMUs deployed. The difference between the SDR and WLS/SDR estimators strictly diminishes as the number of PMUs increases, which suggests that the approximation accuracy of the SDR approach relative to the globally optimum one can be markedly aided by the use of PMU data.

TABLE III

ESTIMATION ERROR WITH % OF CONVERGENCE FOR TEST CASE 3.

| # of PMU | SDR | WLS | WLS/SDR |
|---|---|---|---|
| 0 | 0.247 | 2.141 (66.0%) | 0.104 (100%) |
| 1 | 0.122 | 0.678 (94.4%) | 0.063 (100%) |
| 2 | 0.062 | 0.335 (96.6%) | 0.040 (100%) |
| 3 | 0.036 | 0.280 (98.8%) | 0.025 (100%) |
| 4 | 0.019 | 0.061 (99.6%) | 0.015 (100%) |

Test Case 4:

To investigate the performance and scalability of the proposed algorithms, the IEEE 57- and 118-bus systems were tested extensively under scenarios similar to Test Cases 1-3 for the 30-bus system. For example, Table III lists the estimation error performance based on the 118-bus system with all real and reactive power flow measurements along all 186 lines. Other simulation settings follow exactly Test Case 1. Clearly, the results here again confirm the near-optimal error performance of the proposed SDR-SE approach, while the Gauss-Newton iterative method suffers progressively worse in performance as divergence increases with the system size, especially if good initializations are not available (Θ=0.5π). Additional numerical tests verifying the near-optimal performance and the capability to include PMU data demonstrated results identical to those of Test Cases 1-3, and hence are omitted due to page limitations.

Instead, the computational costs for all three systems are compared in Table IV. Both algorithms are run using the MATLAB R2011a software, on a typical Windows XP computer with a 2.8 GHz CPU. The SDR-based solver takes reasonably more time (around 20 seconds for the 118-bus system), which scales gracefully with the system size. The WLS iterations incur increasing computational time mainly due to the higher divergence rate in larger systems. Notice that here the general-purpose SeDuMi is used to solve (10), without exploiting its special problem structure. Much more efficient solvers are expected with distributed and parallel computational modules, as well as sparsity-exploiting convex optimization techniques, which are currently pursued.

TABLE IV

AVERAGE RUNING TIMES IN SECONDS.

| # of buses | WLS | SDR |
|---|---|---|
| 30 | 0.216 | 1.62 |
| 57 | 0.558 | 4.32 |
| 118 | 2.87 | 21.6 |

Novel SDR-based SE schemes were disclosed for power system monitoring, by tactfully reformulating the nonlinear relationship between legacy meter measurements and complex bus voltages. The nonconvex SE problem was relaxed to a convex SDP one, and thus rendered efficiently solvable via existing interior-point methods. In addition, the convex dual SE problem was formulated to provide insights on the dual equivalence and guidelines to reduce complexity. To account for recent developments in PMU technology, linear state measurements were also incorporated to enhance the proposed SDR-based SE framework. Extensive numerical tests on the 30-bus benchmark system demonstrated the near-optimal performance of the novel approaches.

Further enhancements to the SDR-based SE framework are described below with respect to multi-area distributed counterparts and tailored solvers exploiting the SDP structure. Robust techniques are also described under a cyber-security context to account for malicious attacks or outliers.

In some example, energy management systems may be combined to form a larger network of interconnected power grids. In accordance with the present disclosure, one or more energy management systems may each use SDR to process a linear estimate of the current state of each bus in its respective power system. The energy management systems may further communicate these state estimates to one another, or to a central energy management system. The central energy management system may process the received estimates to compute a global solution of estimates of electrical characteristics for the entire power grid. That is, state estimates of all buses in each of the interconnected power grids.

Figure 6:
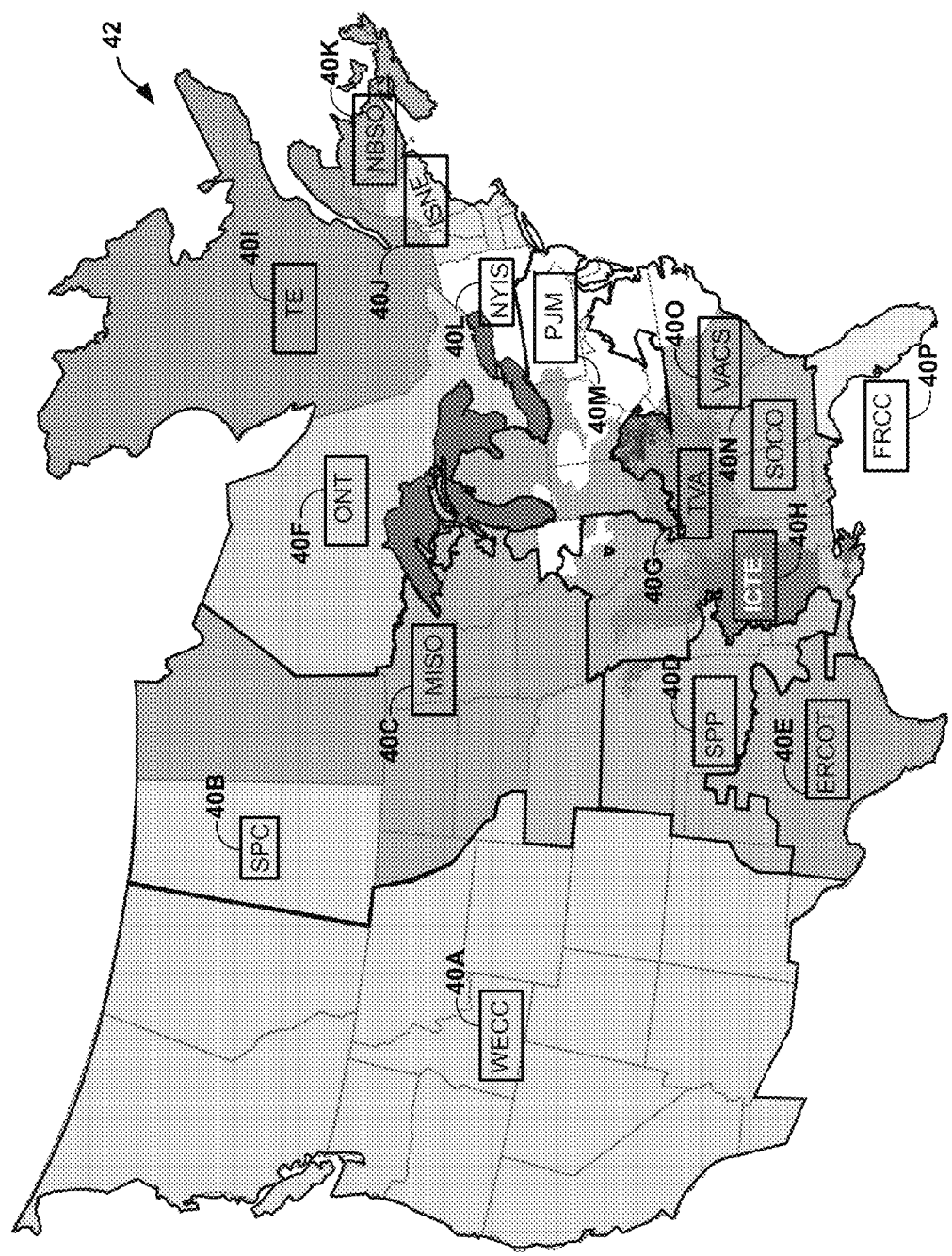
FIG. 6 is a block diagram that shows another example network of multiple interconnected electrical power systems.

FIG. 6 shows another example network 42 of multiple interconnected electrical power systems 40A-40P (power systems 40). In one example, each of power systems 40 contains a number of electrical power buses as well as an energy management system within its respective service area. The energy management systems of power systems 40 may communicate state estimates of their respective power systems to one another. In other examples, each energy management system of power systems 40 may communicate state estimates of their respective power systems to a central energy management system. This system may then process the estimates to determine a global solution providing state estimates of all power buses in each of power systems 40.

An energy management system may be programmed to take certain action in response to computing estimates for the electrical characteristic for all of the buses within the power grid. For example, the energy management system may control operation of one or more of the electrical buses based on the computed to estimates. As another example, the energy management system may generate reports that specify power consumption at each of the buses within the power grid based on the computed estimates. The energy management system may output communications to automatically update an accounting system to charge respective operators of each power buses based on the computed estimates. The energy management system may generate an alert based on the computed estimates.

Robust Power System State Estimation for the Nonlinear AC Flow Model

The electric power grid is a complex cyber-physical system consisting of multiple modules, each with a transmission infrastructure spanning over a huge geographical area, transporting energy from generation sites to distribution networks. Monitoring the operational conditions of grid transmission networks is of paramount importance to facilitate system control and optimization tasks, including security analysis and economic dispatch with security constraints. An important monitoring task for power systems is accurate estimation of the system operation state.

For this purpose, various system variables are measured in distant buses and then transmitted to the control center for estimating the system state variables, namely complex bus voltages. Due to the wide spread of transmission networks and the current integration of enhanced computer/communication infrastructure, the power system state estimation (SE) is challenged by data integrity concerns arising due to "anomalous" measurements affected by outliers and/or adversarial cyber-attacks. Under the nonlinear AC power flow model, the state estimation (SE) problem is inherently nonconvex giving rise to many local optima. In addition to nonconvexity, SE is challenged by data integrity and cyber-security issues. For the AC power flow model however, SE challenges come not only from anomalous data, but are further magnified due to the nonlinear couplings present between meter measurements and state variables. These concerns motivate the development of robust approaches described herein to improve resilience of SE to anomalous (a.k.a. bad) data.

Robust techniques are described that are resilient to outlying measurements and/or adversarial cyber-attacks. In one example implementation, an overcomplete additive outlier-aware measurement model is adopted, and the sparsity of outliers is leveraged to develop a robust state estimation (R-SE) approach to jointly estimate system states and identify the outliers present. Observability and identifiability issues of this model are investigated, and links are established between R-SE and error control coding. The convex semidefinite relaxation (SDR) technique is further pursued to render the nonconvex R-SE problem efficiently solvable. The resultant algorithm markedly outperforms existing iterative alternatives, as corroborated through numerical tests on the standard IEEE 30-bus system.

Referring again to FIG. 1, in some instances, unobservable cyber-attacks to compromise measurements provided by one or more of sensors 14 may fail to be detected by a system operator. A unifying framework is described herein to understand how tolerant the nonlinear regression model is to data corruption, by introducing the notion of measurement distance. The latter is nicely connected to distance metrics popular in channel coding theory, which are known to determine the error-control capability of channel codes. This connection reveals why the measurement distance is useful to characterize the regression function's resilience to outliers.

In addition, the novel R-SE framework described herein lends itself to a convex relaxation approach, which yields R-SE solvers approximating the global optimum. Semidefinite relaxation (SDR) solvers thus emerge as powerful schemes for R-SE of nonlinear AC power flow models. Preliminary tests on the IEEE 30-bus system, as described below, corroborate the performance improvement of the proposed approach. With respect to FIG. 1, consider again a power transmission network 12 with N buses 14 denoted by the set of nodes $\mathcal{N}:=\{1, \ldots, N\}$, and L transmission lines 15 represented by the set of edges $\mathcal{E}:=\{(n,m)\} \subseteq \mathcal{N} \times \mathcal{N}$. Suppose M measurements are taken for estimating the complex voltage states $\{V_n\}_{n \in \mathcal{N}}$ from a subset of the following system variables:

$P_n(Q_n)$: the real (reactive) power injection at bus n (negative if bus n is connected to a load);

$P_{mn}(Q_{mn})$: the real (reactive) power flow from bus m to bus n; and $|V_n|$: the voltage magnitude at bus n.

Compliant with the AC power flow model, these measurements obey nonlinear equations relating them with the system state vector $v:=[V_1, \ldots, V_N]^T \in \mathbb{C}^N$. These equations also involve the injected currents of all buses that are here collected in the vector $i:=[I_1, \ldots, I_N]^T \in \mathbb{C}^N$, as well as the currents, flowing from say bus m to n, denoted by $I_{mn}$. Kirchoff's law in vector-matrix form simply dictates $i=Yv$, where $Y \in \mathbb{C}^{N \times N}$ denotes the grid's symmetric bus admittance matrix having (m,n)-th entry given by:

$$Y_{mn} := \begin{cases} -y_{mn}; & \text{if } (m; n) \in \mathcal{E} \\ y_{nm} + \sum_{v \in N_n} y_{nv}; & \text{if } m = n \\ 0; & \text{otherwise} \end{cases} \quad (1.A)$$

with $y_{mn}$ denoting the line admittance between buses m and n; $y_{nn}$ bus n's admittance to the ground; and $\mathcal{N}_n$ the set of all buses linked to bus n through transmission lines. In addition, the current flow is given by $I_{mn} = \bar{y}_{mn} V_m + y_{mn}(V_m - V_n)$, with $\bar{y}_{mn}$ standing for the shunt admittance at bus m associated with line (m,n). Clearly, all current variables are linearly related to the state v. As for the nonlinear measurements, the AC power flow model asserts that the apparent power injection into bus n is given by $P_n + jQ_n = V_n i_n^*$, while the apparent power flow from bus m to bus n by $P_{mn} + jQ_{mn} = V_m I_{mn}^*$. Further, expressing the squared bus voltage magnitude as $|V_n|^2 = V_n V_n^*$, it is clear that all measurable quantities listed earlier are nonlinearly (in fact quadratically) related to v.

Apart from the nonlinearity present, another challenge present in the SE is due to grossly corrupted meter measurements (a.k.a. bad data). Statistical tests such as the largest normalized residuals of the weighted least-squares (WLS) estimation error are typically employed to reveal and remove bad data. Alternatively, robust estimators, such as the least-absolute deviation, or Huber's M-estimators have also been considered. The robust SE (R-SE) techniques described herein make use of an overcomplete model for the outlying data. To this end, collect first the M measurements in the vector $z:=[\{\checkmark P_n\}_{n \in \mathcal{N}_P}, \{\checkmark Q_n\}_{n \in \mathcal{N}_Q}, \{\checkmark P_{mn}\}_{(m,n) \in \mathcal{E}_P}, \{\checkmark Q_{mn}\}_{(m,n) \in \mathcal{E}_Q}, \{\checkmark |V_n|^2\}_{n \in \mathcal{N}_V}]^T$, where the check mark differentiates measured values from the noise-free variables. For consistency with other measurements, $|V_n|^2$ is considered from now on. This is possible by adopting $\angle V_n| = |V_n| + \epsilon_V$, where $\epsilon_V$ is zero-mean Gaussian with small variance $\sigma_V^2$, to obtain the approximate model $\angle V_n|^2 \approx |V_n|^2 + \epsilon_V'$, where $\epsilon_V'$ has variance $4 \angle V_n|^2 \sigma_V^2$. Consider also the scalar variables $\{a_l\}_{l=1}^M$ one per measurement, taking the value $a_l=0$ if the l-th measurement obeys the nominal (outlier-free) model, and $a_l \neq 0$ if it corresponds to a bad datum. This way, the nonlinear measurement model becomes:

$$z_l = h_l(v) + \epsilon_l + a_l, \ l=1, \ldots, M \tag{2.A}$$

where $h_l(\bullet)$ captures the quadratic relationship specified by the aforementioned AC power flow equations, and the zero-mean additive Gaussian white noise (AWGN) $\epsilon_l$ is assumed uncorrelated across meters with variance $\sigma_l^2$.

Recovering both v and the M×1 vector $a:=[a_1, \ldots, a_M]^T$ essentially reveals the state and identifies faulty measurements. In this way, the vector a of the model is a state vector that indicates an untrustworthiness of the measurements and identifies faulty measurements. In this example implementation, zero indicates trustworthy and a non-zero may indicates the measurement is not trustworthy. By having an indication of the trustworthiness, the techniques can applying semidefinite relaxation to compute a solution for state of the power buses while eliminating outliers, such as bad data due to communication error or data that has been compromised due to attack. In other words, the techniques are able to construct and resolve the state estimation in a manner that eliminates any meter measurements that are significantly different from the other meters than the techniques can identify and eliminate the outlier.

The system in (2.A) with both v and a being unknown is under-determined, as the number of measurements M is always less than the number of unknowns N+M. Instrumental to handling this under-determinacy will be the (arguably low) percentage of outliers, which gives rise to a (high) level of sparsity, that is the number of zero entries in a. The degree of sparsity will be further linked in the ensuing section with the notions of observability and identifiability of the outlier vector. By capitalizing on the sparsity of a, the goal of jointly estimating and identifying v and a can be achieved by the following outlier-sparsity-controlling criterion:

$$\{\hat{v}, \hat{a}\} := \operatorname{argmin}_{v,a} \sum_{l=1}^M w_l[z_l - h_l(v) - a_l]^2 + \lambda |a|_0 \tag{3.A}$$

where $w_l := 1/\sigma_l^2 \forall l$, and $\lambda > 0$ scales the regularization term which comprises the $l_0$-pseudonorm, i.e., the number of non-zero $a_l$'s that naturally controls the number of outliers in $\hat{a}$. In this way, the coefficient $\lambda$ provides a configurable parameter for outlier control. The coefficient $\lambda$ can be adjusted to control level of trustworthiness to be applied to the data. The coefficient $\lambda$ can be selected in a variety of ways, such as by an administrator based on statistical test, prior knowledge or data.

Even with linear models, solving the optimization problem in (3.A) is NP-hard due to the $l_0$-norm regularization. Before proposing efficient schemes for solving the under-determined problem in (3.A), the next section will provide observability and identifiability analysis to assess the ability of R-SE to cope with sparse outlier patterns.

Outlier Observability and Identifiability

The goal of this section is to investigate fundamental uniqueness issues associated with the system under-determinacy arising due to the overcomplete outlier-aware model in (2.A). To isolate uniqueness from noise resilience issues, focus is placed on the noise-free outlier-aware measurement model written in vector form as:

$$z = h(v) + a \tag{4.A}$$

with the high-dimensional function $h(\bullet): C^N \to R^M$.

Definition 1

Given measurements $z = h(v_o) + a_o$, with $v_o$ denoting the true state, and $h(\bullet)$ known, the outlier vector $a_o$ is observable if and only if (iff) $\forall v_o$ the set $$\mathcal{V} := \{v \in C^N | z = h(v_o) + a_o = h(v)\} \tag{5.A}$$

is empty. Furthermore, the outlier vector $a_o$ is identifiable iff $\forall v_o$ the set $$S := \{(v,a) | h(v) + a = z, |a|_0 \leq |a_o|_0\} \tag{6.A}$$

has only one element, namely $(v_o, a_o)$.

Outlier observability and identifiability are important. For an observable $a_o$, upon collecting z, the system operator can discern whether there are bad data or not. In addition, for an identifiable $a_o$, the system operator can recover exactly (in the absence of nominal noise) both $a_o$ and $v_o$ in the presence of bad data.

Definition 1 implies that if $a_o$ is identifiable, then it is necessarily observable, because otherwise the set $\mathcal{V}$ in (5.A) would have at least one element $v' \in C^N$; in which case, the pair $(v', 0)$ would be an additional second element of S in (6.A)—a fact contradicting identifiability. Therefore, as a property of an outlier vector $a_o$ identifiability is stronger than (i.e., subsumes) its observability.

Without accounting for the nominal AWGN in (2.A), it is possible to reduce the cost in (3) to only the $l_0$-norm, while including the quadratic part as equality constraint to obtain $$\{\hat{v}, \hat{a}\} := \operatorname{argmin}_{h(v)+a=z} |a|_0 \tag{7.A}$$

$$= \operatorname{argmin}_{v, a=z-h(v)} |z - h(v)|_0.$$

Clearly, for the noise-free R-SE problem in (7.A), the pair $(v_o, a_o)$ is feasible, and the cost evaluated at $(v_o, a_o)$ equals $|z - h(v_o)|_0 = |a_o|_0$. This is also the minimum cost attainable when $a_o$ is identifiable, as there is no other pair $(v, a)$ with smaller $l_0$-norm $|a|_0$ according to Definition 1. Conversely, if the noise-free problem (7.A) has a unique solution given by $(v_o, a_o)$, then $a_o$ is identifiable. Similarly, the noise-free R-SE formulation can easily detect the presence of bad data if the minimum achievable is non-zero. This clearly demonstrates the role of the outlier vector's $l_0$-norm in the R-SE criterion (3.A), in identifying the presence of bad data, or, in recovering the true state even when bad data are present.

A critical attribute for an observable (identifiable) outlier vector is its maximum sparsity level $K_o$ (respectively $K_i$). To appreciate this, consider the two broad classes that outliers typically come from. The first class includes bad data emerging due to faulty meters, telemetry errors, or software bugs, which generally occur rarely, that is with low probability and references therein. Here, $K_o$ quantifies the maximum number of bad data that can be revealed with high probability; while $K_i$ denotes the maximum number of outlying meters that can be identified so that recovery of the true state becomes feasible. The second source of outliers comprises malicious data attacks, in which the adversary can typically control only a subset of meters with limited cardinality. In this class of outliers, $K_o$ and $K_i$ can suggest the minimum number of meters that must be protected to render malicious data attacks ineffective.

Even though $K_o$ ($K_i$) is useful for assessing the degree of outlier observability (identifiability), deciding whether a given vector $a_o$ is observable or identifiable for the nonlinear AC model (4.A) is challenging, except for the trivial case $a_o=0$. Fortunately, it is possible to obtain $K_o$ and $K_i$ leveraging the notion of the measurement distance for any nonlinear function $h(\bullet)$, as defined next.

Definition 2

The measurement distance for the function $h(\bullet):\mathbb{C}^N \to \mathbb{R}^M$ is given by $$D(h) := \min_{v \neq v'} |h(v) - h(v')|_0 \qquad (8.A)$$

$$= \min_{v \neq v'} \sum_{l=1}^{M} 11[h_l(v) - h_l(v')]$$

where 11 denotes the indicator function.

The notion of measurement distance parallels that of the Hamming distance in channel coding theory. Given any linear mapping over a known finite field, the Hamming distance characterizes the minimum difference between any two strings that lie in the mapped space, and it can be easily computed for fixed problem dimensions. However, for the R-SE problem of interest, $v$ is drawn from the complex field $\mathbb{C}^N$, while the mapping $h(\bullet)$ is quadratic. Compared to the Hamming distance it will be generally very challenging to compute $D(h)$ in (8.A).

Interestingly, as the Hamming distance has been popular due to its connection with the error control capability of linear channel codes, the measurement distance in (8.A) will turn out to be particularly handy in characterizing outlier observability and identifiability, as asserted in the following proposition.

Proposition 1

Given the measurement distance $D$ for the nonlinear function $h(\bullet)$ in (8.A), the maximum sparsity level of an observable outlier vector is $K_o = D-1$, while the maximum one of an identifiable outlier vector is $$K_i = \left\lfloor \frac{D-1}{2} \right\rfloor.$$

The proof for both statements follows readily from Definition 1.A using simple contradiction arguments, and for this reason it is omitted. Notice that the second part can also be deduced, which neither explicitly relates to the notion of measurement distance, nor it is linked with the maximum sparsity level of observable outliers.

Using the measurement distance metric, Proposition 1.A provides a unifying framework to understand the tolerance of any function $h(\bullet)$ to the number of outlying data. Since the measurement distance of any nonlinear function is difficult to obtain, the ensuing subsection pursues linearized approximants of the quadratic measurement model, which are typically employed by Gauss-Newton iterative SE solvers, and can be used to provide surrogate distance metrics. Depending on initialization, the linear approximants could not only be very accurate, but will also shed light on understanding uniqueness issues associated with nonlinear AC power system models.

Linear Approximation Model

Consider linearizing the nonlinear measurement model (4.A) expressed in terms of the polar coordinates of the state vector. Toward this end, the $N \times 1$ complex vector $v$ is mapped first to the $2N \times 1$ real vector $x := [|V_1|, \ldots, |V_N|, \angle V_1, \ldots, \angle V_N] \in \mathbb{R}^{2N}$. Invoking the first-order Taylor expansion, the noise-free $z$ can be approximated around a given point $v$, or the corresponding $x$, by $$z = h(v) + a \approx h(v) + H_x(x - x) + a \qquad (9.A)$$

where $H_x \in \mathbb{R}^{M \times (2N)}$ denotes the Jacobian matrix evaluated at $x$. Upon defining $z := z - h(v) + H_x x$, the approximate model (9.A) becomes a linear one in the unknown $x$, that is $$z \approx H_x x + a. \qquad (10.A)$$

The measurement distance of the linear function in (10.A) can be found easily, as summarized next.

Proposition 2.A

The measurement distance for any linear mapping characterized by a full column-rank matrix $H_x \in \mathbb{R}^{M \times (2N)}$ is $D = M+1-\text{rank}(H_x)$.

The proof relies on simple linear algebra arguments as follows. Using Definition 2.A, the measurement distance $D := \min_{x-x' \neq 0} |H_x(x-x')|_0$ is attained when matrix $H_x$ has at most $(M-D)$ linearly dependent rows; otherwise, the number of zero entries of $H_x(x-x')$ would be $(M-D+1)$ and that of non-zero ones $(D-1)$, which leads to a contradiction; hence, rank $(H_x) = M-D+1$, as asserted by Proposition 2.A.

Recalling from Proposition 1.A how $D$ is linked with the outlier observability and identifiability levels, the next corollary follows readily.

Corollary 1

For any linear mapping characterized by $H_x$, the maximum sparsity level of an observable outlier is $K_o = M - \text{rank}(H_x)$, while the maximum sparsity level of an identifiable outlier is $$K_i = \left\lfloor \frac{M - \text{rank}(H_x)}{2} \right\rfloor.$$

For the linear approximation model in (10.A), the measurement distance $D$ grows linearly with the number of meters $M$. This demonstrates that measurement redundancy is very beneficial for improving resilience to outliers. Conceivably, $D$ could be further boosted thanks to the nonlinearity in $h(\bullet)$. Compared to its linear counterpart, the quadratic function $h(\bullet)$ is likely to increase the dimension of the space that is mapped to, and thus lead to a larger measurement distance in a space of higher dimensionality. This is precisely the reason why highly nonlinear functions find important applications to cryptography. Although linearization provides a viable approximant, quantifying (or bounding) the measurement distance for the quadratic $h(\bullet)$ corresponding to the AC power flow model constitutes an interesting future research direction.

Solving the R-SE via SDR

This section will leverage convex relaxation techniques to solve the R-SE problem in (3.A). First, building on the premise of compressive sampling, the $l_1$-norm can be employed to tackle the NP-hard $l_0$-norm and relax the R-SE cost in (3.A) to $$\{\hat{v}, \hat{a}\} : \arg\min_{v,a} \sum_{l=1}^{M} w_l [z_l - h_l(v) - a_l]^2 + \lambda |a|_1. \qquad (11.A)$$

One goal of the techniques described herein is to develop an R-SE solver capable of accounting for the practical AC quadratic measurement model, while attaining or approximating the global optimum at polynomial-time complexity.

This task will be pursued here using semidefinite relaxation (SDR), which is a powerful technique for convexifying the SE with nonlinear measurement models. To this end, each quadratic measurement $z_l$ will be expressed linearly in terms of the outer-product matrix $V := vv^H$. Let $\{e_n\}_{n=1}^{N}$ denote the canonical basis of $\mathbb{R}^N$, and define the following admittance-related matrices $$Y_n := e_n e_n^T Y \tag{12a.A}$$

$$Y_{mn} := (y_{mn} + \bar{y}_{mn}) e_m e_m^T - y_{mn} e_m e_n^T \tag{12b.A}$$

and their related Hermitian counterparts $$H_{P,n} := \frac{1}{2}(Y_n + Y_n^{\mathcal{H}}), \quad H_{Q,n} := \frac{j}{2}(Y_n - Y_n^{\mathcal{H}}) \tag{13a.A}$$

$$H_{P,mn} := \frac{1}{2}(Y_{mn} + Y_{mn}^{\mathcal{H}}), \quad H_{Q,mn} := \frac{j}{2}(Y_{mn} - Y_{mn}^{\mathcal{H}}) \tag{13a.A}$$

Using these definitions, the following lemma is proved to establish a linear model in the complex rank-one matrix V.
Lemma 1 All error-free measurement variables are linearly related with the outer-product V as $$P_n = Tr(H_{P,n} V), \quad Q_n = Tr(H_{Q,n} V) \tag{14a.A}$$

$$P_{mn} = Tr(H_{P,mn} V), \quad Q_{mn} = Tr(H_{Q,mn} V) \tag{14b.A}$$

$$|V_n|^2 = Tr(H_{V,n} V). \tag{14c.A}$$

Thus, the measurement $z_l$ in (2) can be written as $$z_l = h_l(v) + \epsilon_l + a_l = Tr(H_l V) + \epsilon_l + a_l \tag{15A}$$

where $H_l$ is a Hermitian matrix specified in accordance with (13a)-(13c).

Lemma 1 implies the following equivalent reformulation of (11.A)

$$\{\hat{V}_1, \hat{a}_1\} := \arg\min_{V,a} \sum_{l=1}^{M} W_l [z_l - Tr(H_l V) - a_l]^2 + \lambda \|a\|_1 \tag{16a.A}$$

$$s. \text{ to } V \in \mathbb{C}^{N \times N} \succeq 0, \text{ and } \text{rank}(V) = 1 \tag{16b.A}$$

where the positive semi-definiteness and rank constraints jointly ensure that for any V admissible to (16b.A), there always exists a state vector $v \in \mathbb{C}^N$ such that $V = vv^H$.

Albeit the linearity between $z_l$ and V in the new formulation (16), nonconvexity is still present in two aspects: i) the cost in (16a.A) has degree 4 wrt the entries of V; and ii) the rank constraint in (16b.A) is nonconvex. Aiming for a semidefinite programming (SDP) formulation of (16.A), Schur's complement lemma can be leveraged to convert the summands in (16a) to a linear cost over an auxiliary vector $\chi \in \mathbb{R}^M$. Specifically, with $w := [w_1, \ldots, w_L]^T$ and likewise for $\chi$, consider an R-SE reformulation as:

$$\{V_2, a_2, \chi_2\} := \arg\min_{V, a, \chi} w^T \chi + \lambda \|a\|_1 \tag{17a.A}$$

$$s. \text{ to } V \succeq 0, \text{ and } \text{rank}(V) = 1 \tag{17b.A}$$

$$\begin{bmatrix} -\chi_l & z_l - Tr(H_l V) \\ z_l - Tr(H_l V) & -1 \end{bmatrix} - a_l \preceq 0 \, \forall l \tag{17c.A}$$

The equivalence among all three R-SE formulations can be asserted as follows.
Proposition 3.A
For the AC power flow model, all three nonconvex formulations in (11.A), (16.A), and (17.A), solve an equivalent R-SE problem. For the optima of these problems, it holds that $$\hat{V}_1 \triangleq \hat{V}_2 \triangleq \hat{v} \hat{v}^H \text{ and } \hat{\chi}_{2,l} = [z_l - Tr(H_l \hat{V}_2)]^2 \forall l. \tag{18.A}$$

Proposition 3.A establishes the relevance of the novel R-SE formulation (17.A), which is still nonconvex though, due to the rank-1 constraint. Fortunately though (17.A) is amenable to the SDR technique, which amounts to dropping the rank constraint and has well-appreciated merits as an optimization tool. The contribution here consists in permeating the benefits of this powerful optimization tool to estimating the state of AC power systems, even when outliers (bad data or cyber-attacks) are present.

In the spirit of SDR, relaxing the rank constraint in (17b.A) leads to the following SDP formulation:

$$\{\hat{V}, \hat{a}, \hat{\chi}\} := \arg\min_{V, a, \chi} w^T \chi + \lambda \|a\|_1 \tag{19a}$$

$$s. \text{to } V \succeq 0 \tag{19b}$$

$$\begin{bmatrix} -\chi_l & z_l - Tr(H_l V) - a_l \\ z_l - Tr(H_l V) - a_l & -1 \end{bmatrix} \preceq 0 \, \forall l \tag{19c}$$

SDR endows R-SE with a convex SDP formulation for which efficient schemes are available to obtain the global optimum using, e.g., the interior-point solver SeDuMi [18]. The worst-case complexity of this SDP solver is $O(M^4 \sqrt{N} \log(1/\epsilon))$ for a given solution accuracy $\epsilon > 0$. For typical power networks, M is in the order of N, and thus the worst-case complexity becomes $O(N^{4.5} \log(1/\epsilon))$. Further computational complexity reduction is possible by exploiting the sparsity, and the so-called "chordal" data structure of matrix V.

Nonetheless, the SDP problem (19) is only a relaxed version of the equivalent R-SE in (17); hence, its solution $\hat{V}$ may have rank greater than 1, which makes it necessary to recover a feasible estimate $\hat{v}$ from $\hat{V}$. This is possible by eigen-decomposing $$\hat{V} = \sum_{i=1}^{r} \lambda_i u_i u_i^{\mathcal{H}},$$

where $r := \text{rank}(\hat{V})$, $\lambda_1 \geq \ldots \geq \lambda_r > 0$ denote the positive ordered eigenvalues, and $\{u_i \in \mathbb{C}^N\}_{i=1}^{r}$ are the corresponding eigenvectors. Since the best (in the minimum-norm sense) rank-one approximation of $\hat{V}$ is $\lambda_1 u_1 u_1^{\mathcal{H}}$, the state estimate can be chosen equal to $\hat{v}(u_1) := \sqrt{\lambda_1} u_1$.

Besides this eigenvector approach, randomization offers another way to extract an approximate R-SE vector from $\hat{V}$, with quantifiable approximation accuracy. The basic idea is to generate multiple Gaussian distributed random vectors $v \sim \mathcal{CN}(0, \hat{V})$, and pick the one with the minimum error cost corresponding to the set of inlier meters $\mathcal{M}_i := \{l | 1 \leq l \leq M, \hat{a}_l \neq 0\}$. Note that although any vector v is feasible for (11.A), it is still possible to decrease the minimum achievable cost by rescaling to obtain $\hat{v}(v) = \hat{c} v$, where the optimal weight can be chosen as the solution of the following convex problem as $$\hat{c} = \arg\min_{c > 0} \sum_{l \in \mathcal{M}_i} w_l (z_l - c^2 v^{\mathcal{H}} H_l v)^2 \tag{20.A}$$

$$= \sqrt{\frac{\sum_{l \in \mathcal{M}_i} w_l z_l v^{\mathcal{H}} H_l v}{\sum_{l \in \mathcal{M}_i} w_l (v^{\mathcal{H}} H_l v)^2}}$$

It will be of interest to find approximation bounds for the SDR-based R-SE approach, or, obtain meaningful conditions under which the relaxed solution coincides with the unrelaxed one. Both problems constitute interesting future directions for analytical research, while the ensuing section will demonstrate the performance improvement possible with the proposed method using numerical tests of practical systems.

Simulation Results

The novel SDR-based R-SE approach was tested using the IEEE 30-bus system with 41 transmission lines, and compared to existing WLS methods that are based on Gauss-Newton iterations. The software toolbox MAT-POWER was used to generate the pertinent power flow and meter measurements. In addition, its SE function doSE has been adapted to realize the WLS Gauss-Newton iterations. The iterations terminated either upon convergence, or, once the condition number of the approximate linearization exceeds $10^8$, which flags divergence of the iterates. To solve the SDR-based R-SE problems, the MATLAB-based optimization package CVX was used, together with the interior-point method solver SeDuMi.

The real and reactive power flows along all 41 lines were measured, together with voltage magnitudes at 30 buses. AWGN corrupts all measurements, with $\sigma_l$ equal to 0.02 at power meters, and 0.01 at voltage meters. Except for the reference bus phasor $V_{ref}=1$, each bus has its voltage magnitude Gaussian distributed with mean 1 and variance 0.01, and its voltage angle uniformly distributed over $[-0.5\pi, 0.5\pi]$.

Figure 7A:
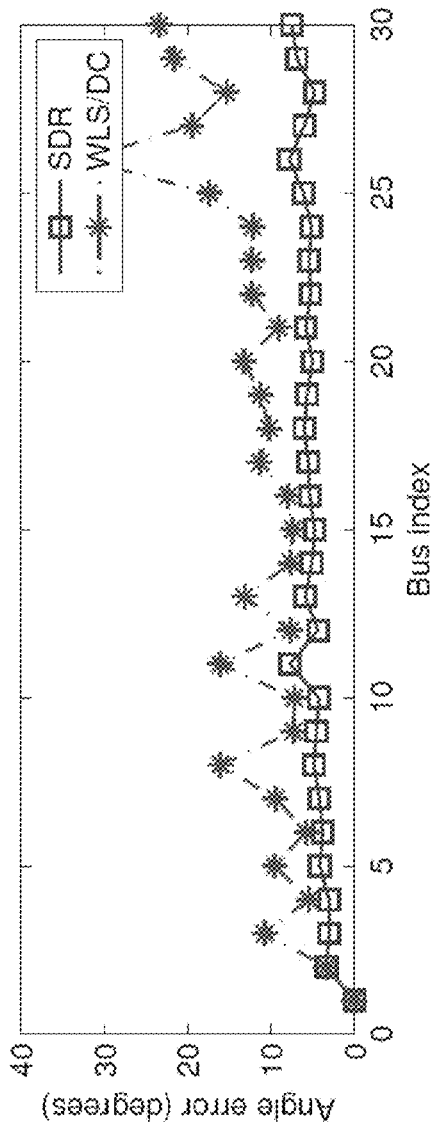
FIGS. 7A and 7B are graphs that compare estimation errors in voltage magnitudes and angles between SDR and WLS solvers at different buses for robust semidefinite estimation.
Figure 7B:
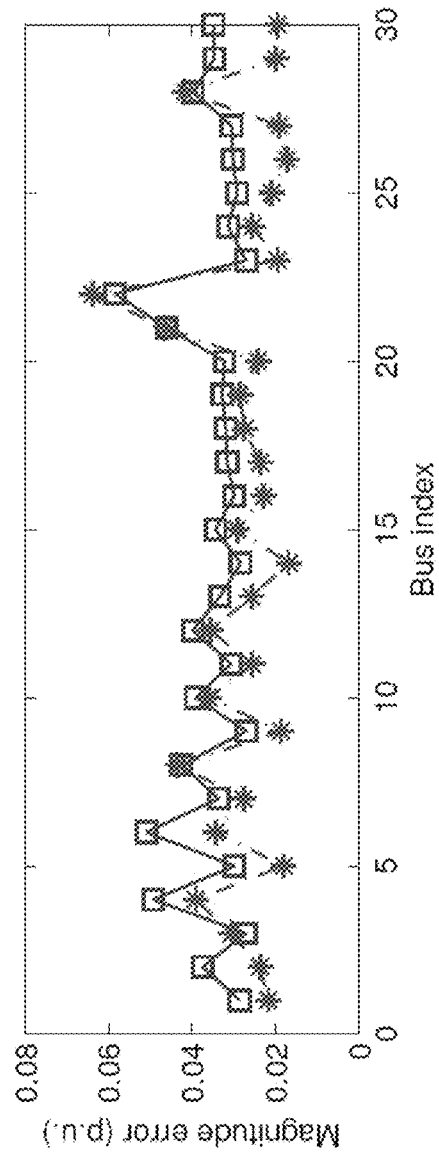

FIGS. 7A and 7B are graphs that compare estimation errors in voltage magnitudes and angles between SDR and WLS solvers at different buses for robust semidefinite estimation. In FIGS. 7A and 7B, the empirical voltage angle and magnitude errors per bus, averaged over 500 Monte-Carlo realizations, are plotted. In each realization, one power flow meter measurement is randomly chosen as a bad datum, after multiplying the meter reading by 1.2. Clearly, the techniques described herein greatly reduces the effects of bad data in the estimation error in voltage phase angles (upper), which may be a more important SE performance metric than the magnitude one.

For the practical nonlinear AC power system model, uniqueness issues and robust state estimation (R-SE) algorithms were identified in this disclosure, when outliers (bad data and/or malicious attacks) are present. Using a sparse overcomplete outlier model, observability and identifiability issues were quantified using the notion of measurement distance for the quadratic measurement model. Valuable insights and computable levels of outlier observability and identifiability were provided herein for linear approximations of the quadratically nonlinear models. A novel SDR-based scheme was also described by tactfully relaxing the nonconvex R-SE problem to a convex SDP one, thus rendering it efficiently solvable via existing interior-point methods. Numerical simulations on the 30-bus benchmark system demonstrated improved performance of the proposed R-SE scheme.

Multi-Area State Estimation Using Distributed SDP for Nonlinear Power Systems

The electric power grid is a complex system consisting of multiple regional subsystems, each with its own transmission infrastructure spanning over a huge geographical area. Being an important power system monitoring task, state estimation (SE) has been traditionally performed at regional control centers with limited interaction. With the deregulation of energy markets however, large amounts of power are transferred among control areas over the tie-lines at high rates. This is part of the system-level institutional changes aiming at an interconnected network with improved reliability. Since each control area can be strongly affected by events and decisions elsewhere, regional operators can no longer operate in a truly independent fashion. At the same time, central processing of the current energy-related tasks faces several limitations: i) vulnerability to unreliable telemetry; ii) high computational complexity at a single control center; and iii) data security and privacy concerns of regional operators.

Reduced-complexity techniques are described in this disclosure for local control areas to solve the centralized SDP-based SE problem in a distributed fashion. That is, techniques are described in which SE is distributed among multiple control areas, possibly for multiple regional operators. The techniques described herein leverage results on positive semidefinite matrix completion to split a global state matrix constraint into local ones, which further allows for parallel implementation using the alternating-direction method of multipliers (ADMM). With minimal data exchanges among neighboring areas, each control center can efficiently perform local updates that scale with each area's size (number of buses). Numerical simulations using the IEEE 14-bus system demonstrate the asymptotic convergence of local state matrices, and desirable estimation accuracy attainable with a limited number of exchanges.

In one example, an SDR-based multi-area SE technique is described that allows the computational complexity per operator to scale with the size of its control area. Solving SDP in a distributed fashion is challenging due to the couplings of local state-related matrices enforced by the positive semidefinite (PSD) constraint of the global state matrix. The graph chordal property is exploited to decompose the global PSD constraint into ones involving local matrices (one per control center). To allow for parallel implementation, equality constraints are enforced over overlapping entries between the local matrices of any pair of neighboring areas. The alternating-direction method of multipliers is further leveraged to develop iterative local solvers attaining the centralized SDR-based SE solutions, at minimal communication overhead.

Centralized SE: an SDR Approach

Figure 8:
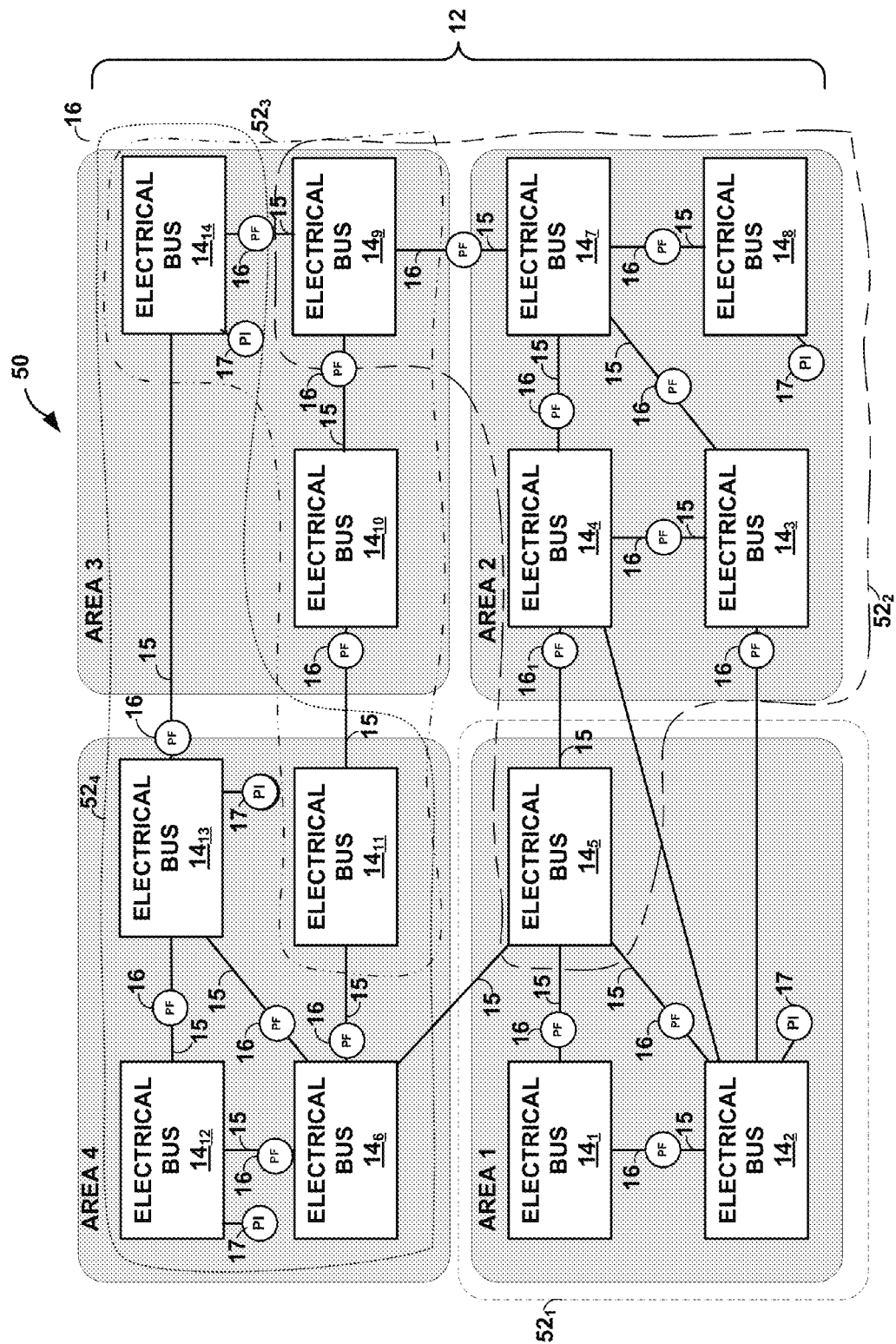
FIG. 8 illustrates another example system that implements techniques described herein to provide local estimates for interconnected power grids in a distributed fashion.

FIG. 8 illustrates a transmission network 50 with N buses 14 (fourteen in the example of FIG. 8) denoted by the set of nodes $\mathcal{N}=\{1, \ldots, N\}$, which consists of K interconnected control areas. Suppose that this set is partitioned as $N=U_{k=1}^K N_k$, where $\mathcal{N}_k$ contains the subset of interconnected buses 14 supervised by the k-th control center. FIG. 8, for example, illustrates buses 14 partitioned into four areas (AREA 1-AREA 4). In this example, each of the areas represents a different control area and includes a separate energy management system that applies the techniques described herein to locally compute a estimates for the electrical characteristics for electrical power buses for the respective power sub-grid within the control area.

To estimate the complex voltage $V_n$ per bus n (in rectangular coordinates), and the state vector $v:=[V_1, \ldots, V_N]^T \in \mathbb{C}^N$ as a whole, each area k collects synchronous measurements in the vector $z_k:=[z_k^1, \ldots, z_k^{M_k}]^T \in \mathbb{R}^{M_k}$. These measurements include real or reactive bus injections, line flows, and bus voltage magnitudes. Adhering to the standard AC power flow model, the power flow along line (n,m) is a quadratic function of only $V_n$ and $V_m$ at the two end buses, while the injected power to bus n is also a quadratic function of $V_n$ and voltages of all neighboring buses. In general, the l-th meter measurement at the k-th area obeys the nonlinear model:

$$z_k^l = h_k^l(v) + \epsilon_k^l, \quad 1 \leq k \leq K, \quad 1 \leq l \leq M_k \tag{1.B}$$

where $h_k^l(\bullet)$ captures the quadratic dependence of $z_k^l$ on $v$, and $\epsilon_k^l$ accounts for the additive measurement noise assumed independent across meters. Without loss of generality, all noise terms are pre-whitened so that each $\epsilon_k^l$ has unit variance. With all the measurements from K areas available, the centralized SE under the maximum-likelihood (ML) criterion boils down to the LS one, given by:

$$\hat{v}_{LS} := \operatorname{argmin}_v \sum_{k=1}^{K} \sum_{l=1}^{M_k} [z_k^l - h_k^l(v)]^2 :. \tag{2.B}$$

The centralized LS problem in (2.B) can be solved via Gauss-Newton iterations. Such iterations linearize the quadratic measurement functions per iteration, and presume an initial guess reasonably close to the global optimum. Otherwise, state iterates may converge to a local optimum, or, even diverge. However, the increasing volatility of power systems due to the integration of renewable energy sources makes it more challenging to acquire a judicious initial guess. One approach is to handle this sensitivity to initialization using a convex relaxation of the nonlinear LS cost. It relies on the fact that each function $h_k^l(\bullet)$ is quadratic with respect to $v$, but linear in the outer-product $V := vv^H$, which leads to re-writing (1.B) as $$z_k^l = Tr(H_k^l V) + \epsilon_k^l, \quad 1 \leq k \leq K, \quad 1 \leq l \leq M_k: \tag{3.B}$$

where $H_k^l$ denotes the N×N matrix that captures the linear relation between $z_k^l$ and $V$ according to $h_k^l(\bullet)$. This way, the centralized SE problem of solving $v$ amounts to an equivalent one involving its outer-product matrix V, namely $$\hat{V}_{LS} := \arg\min_{V \in C^{N \times N}} \sum_{k=1}^{K} \sum_{l=1}^{M_k} [z_k^l - Tr(H_k^l V)]^2 \tag{4a.B}$$

$$s. \text{ to } V \succeq 0, \text{ and } \operatorname{rank}(V) = 1 \tag{4a.B}$$

The PSD constraint along with the non-convex rank constraint guarantee that the obtained $\hat{V}_{LS}$ would be a valid outer-product matrix. In fact, the equivalence of the formulations is established as $\hat{V}_{LS} \triangleq v_{LS} \hat{v}_{LS}^H$. According to SDR technique, the rank constraint in (4b.B) is relaxed, and reformulate an SDP using Schur's complement lemma, that is $$\{\hat{V}, \hat{X}\} := \operatorname{argmin}_{V, X} \sum_{k=1}^{K} \sum_{l=1}^{M_k} X_k^l \tag{5a.B}$$

$$\text{s.to } V \succeq 0, \tag{5b.B}$$

$$\begin{bmatrix} -X_k^l & z_k^l - Tr(H_k^l V) \\ z_l - Tr(H_k^l V) & -1 \end{bmatrix} \preceq 0, \forall k, l. \tag{5c.B}$$

The SDP problem (5.B) allows for general-purpose convex solvers to obtain the solution in polynomial time, while having the potential to attain the global optimum of the centralized SE problem (2.B). However, the worst-case complexity of solving the SDP (5.B) is approximately $O(N^{4.5} \log(1/\epsilon))$ for a given solution accuracy $\epsilon > 0$, while the average complexity can be $O(N^{3.5} \log(1/\epsilon))$. Albeit polynomial, the incurred complexity here may not always scale well with the total number of buses N. Concerns regarding data privacy and integrity also motivate individual control centers to implement distributed SDP solvers with minimal computational and communication costs.

One possible approach for distributed SDP falls under the consensus-based distributed convex optimization framework. Under this framework, each control center keeps a local copy of the state matrix V in (5.B), and aims to iteratively agree with neighboring control areas. However, this consensus-based approach still requires locally solving an SDP problem of the same size as the centralized one, which is computationally burdensome for individual control centers. The ensuing section will introduce a distributed formulation for solving (5.B), enabling the local computational cost to scale with the number of buses per control center.

Distributed SDR-Based SE

To this end, let $\mathcal{N}_{(k)}$ denote the augmented subset of buses involved in all quadratic measurements contained in $z_k$. Typically $\mathcal{N}_l \subseteq \mathcal{N}_{(k)}$, since the latter may include buses from neighboring control areas that are interconnected through tie lines. Taking for example Area 2 in FIG. 8, the subset $\mathcal{N}_{(2)}$ needs to contain bus $14_5$ since there is a line flow meter $16_1$ in Area 2 that is placed on the tie-line connecting buses $14_4$ and $14_5$. Similar reasoning assigns bus $14_9$ also to $\mathcal{N}_{(2)}$. All the four sets $\mathcal{N}_{(k)}$ are indicated by the dotted lassos in FIG. 8. Based on the overlaps among $\{\mathcal{N}_{(k)}\}$, define the set of neighboring control areas for the k-th one as $\mathcal{A}_k := \{j | 1 \leq j \leq K, \mathcal{N}_j \cap \mathcal{N}_{(k)} \neq 0\}$. Hence, Area 2 in FIG. 8 has neighbors in $\mathcal{A}_2 = \{1, 3\}$. Let also the vector $v_{(k)}$ collect the state variables in $\mathcal{N}_{(k)}$. With these notations, it is possible to re-write the measurement models in (1.B) and (3.B) as $$z_k^l = h_{(k)}^l(v_{(k)}) = Tr(H_{(k)}^l V_{(k)}) + \epsilon_k^l, \forall k, l \tag{6.B}$$

where $V_{(k)} := v_{(k)} v_{(k)}^H$ denotes a submatrix of V formed by extracting rows and columns corresponding to buses in $\mathcal{N}_{(k)}$; and similarly for $H_{(k)}^l$. Due to the overlaps among the subsets $\{\mathcal{N}_{(k)}\}$, the outer-product $V_{(k)}$ of the k-th area overlaps also with $V_{(j)}$, for each of its neighboring areas $j \in \mathcal{A}_k$. In this way, the neighboring control areas that are interconnected via transmission lines are identified and the relevant state estimates are shared during computation of the solution. Each transmission line that connects a given control area to an electrical bus within a different one of the control areas and that includes a sensor that provides a measurement associated with the transmission line is identified. In each case, intermediate results for the state estimations may be shared between the energy management systems when locally computing a solution to the state estimates. For example, as described, during the computation of the solution, the estimates for electrical bus $14_5$ from control Area 1 are shared with control Area 2. Similarly, during the computation of the solution, the estimates for electrical bus $14_{14}$ from control Area 3 are shared with control Area 4, the estimates for electrical bus $14_{11}$ from control Area 4 are shared with control Area 3, and the estimates for electrical bus $14_9$ from control Area 3 are shared with control Area 2. As such, for purposes of computation of the state estimates, the subset of the electrical power buses for which state estimates are computed by the energy management system within each of the control areas may be expanded to include electrical busses of other control areas when transmission lines connect the control areas and sensors provides measurements associated with the transmission lines.

By reducing the measurement functions at the k-th area to the submatrix $V_{(k)}$, it is further possible to define the LS error cost per area k as $$f_k(V_{(k)}) := \sum_{l=1}^{M_k} [z_k^l - Tr(H_{(k)}^l V_{(k)})]^2 \quad (7.B)$$

which only involves the local matrix $V_{(k)}$. Hence, the centralized SE problem in (5.B) becomes equivalent to $$\hat{V} = \operatorname{argmin}_V \sum_k f_k(V_{(k)}) \quad (8.B)$$
$$\text{s.to } V \succeq 0.$$

This equivalent formulation effectively expresses the overall LS cost as the superposition of local costs in (7.B). Even with such a decomposition of the cost, the main challenge to implement (8.B) in a distributed manner actually lies in the PSD constraint that couples local matrices $\{V_{(k)}\}$ which overlap partially. If all submatrices $\{V_{(k)}\}$ were non-overlapping, the cost would be decomposable as in (8.B), and the PSD constraint on V would simplify to $V_{(k)} \succeq 0$ per area k. This equivalence may fail to hold if submatrices partially share some entries of V. Nonetheless, these overlaps are beneficial to percolate information across control areas, and this eventually enables the local estimators to have the global performance.

The idea here is to explore valid network topologies with which such PSD constraint decomposition is feasible. To this end, it may be useful to leverage results on completing partial Hermitian matrices to obtain PSD ones. Upon obtaining the underlying graph formed by the specified entries in the partial Hermitian matrices, these results rely on the so-termed graph "chordal" property to establish the equivalence between the positive semidefiniteness of the overall matrix and that of all submatrices corresponding to the graph's maximal cliques. One example implementation of the techniques described herein for distributed SE make use of the alternating direction method-of-multipliers (ADMM), and can be applied to handle any general error cost $f_k$, so long as it is convex in $V_k$.

To decompose the PSD constraint into local ones, construct first a graph $\mathcal{G}$ over the set of buses $\mathcal{N}$, with all its edges corresponding to the entries in $\{V_{(k)}\}$. The graph $\mathcal{G}$ amounts to having all buses within each subset $\mathcal{N}_{(k)}$ to form a clique. Furthermore, the following is assumed:
(as1.B) The graph with all the control areas as nodes and their edges defined by the neighborhood subset $\{\mathcal{A}_k\}_{k=1}^K$ forms a tree.
(as2.B) Each control area has at least one bus that does not overlap with any neighboring area.

Condition (as1.B) is quite reasonable for the control areas in most transmission networks, which in general are loosely connected over large geographical areas by a small number of tie lines. In addition, under the current meter deployment, the tie lines are not monitored everywhere, and thus it is more likely to have tree-connected control areas when requiring neighboring areas to share a tie-line with meter measurements. In FIG. 8 for instance, Areas 1 and 4 are physically interconnected by the tie line connecting bus $14_5$-bus $14_6$. However, there is no measurement on that line, hence the two areas are not considered neighbors and the total four areas eventually form a line array. Moreover, condition (as2.B) easily holds since in practice most of the buses are not connected to any tie line.

Proposition 1.B

Under (as1.B) and (as2.B), the graph $\mathcal{G}$ with all its edges corresponding to the entries in $\{V_{(k)}\}$ is a chordal graph; meaning, there are no minimal cycles of length greater than 3 in $\mathcal{G}$. Furthermore, all the maximal cliques of $\mathcal{G}$ are captured by the subsets $\{\mathcal{N}_{(k)}\}$.

Proposition 1.B can be proved by finding contradicting arguments for finding possible minimal cycles of more than 3 nodes. If there exists a minimal cycle by nodes $\{n_l\}_{l=1}^4$ connected in a sequence, it is impossible to have any 3 out of the 4 nodes form a single subset $\mathcal{N}_{(k)}$; otherwise, these 3 nodes would form a minimal cycle by themselves. In addition, suppose the 4 nodes are from two subsets, that is, nodes $\{n1,n2\} \subseteq \mathcal{N}_{(k)}$, while $\{n3,n4\} \subseteq \mathcal{N}_{(j)}$. The edge $(n2,n3) \in \mathcal{G}$ implies that areas k and j are neighbors, and further either n2 or n3 is a common bus. Let the common bus be $n2 \in \mathcal{N}_{(k)}$, which in turn forms a 3-node cycle with n3 and n4. Applying this argument by contradiction, it is possible to show the chordal property for the graph $\mathcal{G}$. For the second part of Proposition 1.B, all cliques $\{\mathcal{N}_{(k)}\}$ are maximal since condition (as2.B) excludes the case that one clique may lie within another one.

Given any entry of $\{V_{(k)}\}$, the full PSD matrix V is "completable" if and only if $\mathcal{G}$ is chordal, and all its submatrices corresponding to the maximal cliques are all PSD. Hence, satisfying the PSD constraint $V \succeq 0$, is tantamount to enforcing the constraint on all local matrices $V_{(k)} \succeq 0$, $\forall k$. With this equivalence, the centralized SDR-based SE problem (8.B) can be re-written as $$\hat{V} = \operatorname{argmin}_V \sum_k f_k(V_{(k)}) \quad (9.B)$$
$$\text{s.to } V_{(k)} \succeq 0, \forall k.$$

The constraint decomposition in (9.B) is key for developing distributed solvers. To this end, each control area k solves for its own local $V_{(k)}$, denoted by the complex matrix $W_k$ of size $|\mathcal{N}_{(k)}| \times |\mathcal{N}_{(k)}|$. For every pair of neighboring areas, say k and j, identify the intersection of their buses as $S_{kj}$. Let also $W_k^j$ denote the submatrix extracted from $W_k$ with both rows and columns corresponding to $S_{kj}$; and likewise for the submatrix $W_j^k$ from $W_j$. To formulate the centralized SE problem (9.B) as one involving all local matrices $\{W_k\}$, it suffices to have additional equality constraints on the overlapping entries, namely $$\{\hat{W}_k\} = \operatorname{argmin}_{\{W_k\}} \sum_K f_k(W_{(k)}) \quad (10.B)$$
$$\text{s.to } W_k \succeq 0, \forall k,$$
$$W_k^j = W_j^k, \forall j \in \mathcal{A}_k, \forall k.$$

The equality constraints of (10.B) enforce neighboring areas to consent on their shared entries, which renders the equivalence between (10 and (9.B) established as $\hat{W}_k \triangleq W_{(k)}$, $\forall k$. Interestingly, this overcomes couplings of the PSD constraint, and will allow for powerful distributed implementation modules to realize multi-area SDR-based SE, as elaborated in the ensuing section.

Alternating Direction Method-of-Multipliers

Clearly, the equality constraints in (10.B) couple the optimization problems across the K areas. To enable a fully distributed solution, two auxiliary matrices denoted by $R_{kj}$ and $I_{kj}$ are introduced per pair of neighboring areas k, j. For notational brevity, symbols $R_{kj}$ and $R_{jk}$ are used interchangeably for the same matrix; and similarly for $I_{kj}$ and $I_{jk}$. Then, (10.B) can be alternatively expressed as $$\{\hat{W}_k\} = \operatorname{argmin}_{\{W_k \succeq 0\}} \sum_K f_k(W_{(k)}) \quad (11.B)$$

$$\text{s.to } \mathcal{R}(W_k^j) = R_{kj}, \forall j \in \mathcal{A}_k, \forall k,$$

$$\mathcal{I}(W_k^j) = I_{kj}, \forall j \in \mathcal{A}_k, \forall k :.$$

The goal is to solve (11.B) in a distributed fashion using the alternating direction method of multipliers (ADMM), a method that has been successfully applied to various distributed optimization problems. Let $\Gamma_{kj}$ and $\Lambda_{kj}$ denote the Lagrange multipliers associated with the pair of constraints in (11.B). With c>0 denoting a penalty coefficient, consider the augmented Lagrangian function of (11.B) as $$\mathcal{L}(\{W_k\}, \{R_{kj}\}, \{I_{kj}\}, \{\Gamma_{kj}\}, \{\Lambda_{kj}\}) := \quad (12.B)$$

$$\sum_k \left\{ f_k(W_k) + \sum_{j \in \mathcal{A}_k} Tr[\Gamma_{kj}(\mathcal{R}(W_k^j) - R_{kj})] + \right.$$

$$\sum_{j \in \mathcal{A}_k} \frac{c}{2} |\mathcal{R}(W_k^j) - R_{kj}|_F^2 +$$

$$\left. \sum_{j \in \mathcal{A}_k} Tr[\Lambda_{kj}(\mathcal{I}(W_k^j) - I_{kj})] + \sum_{j \in \mathcal{A}_k} \frac{c}{2} |\mathcal{I}(W_k^j) - I_{kj}|_F^2 \right\}.$$

Letting i denote the iteration index in the superscript, the ADMM operates by minimizing the Lagrangian L in (12.B) cyclically with respect to one set of variables while fixing the rest. Given all the iterates at the i-th iteration, the ADMM steps proceed to the ensuing iteration as follows.

[S1] Update the primal variables:

$$\{W_k^{i+1}\} := \operatorname{argmin}_{W_k} L(\{W_k\}, \{R_{kj}^i\}, \{I_{kj}^i\}, \{\Gamma_{kj}^i\}, \{\Lambda_{kj}^i\})$$

[S2] Update the auxiliary variables:

$$\{R_{kj}^{i+1}, I_{kj}^{i+1}\} := \operatorname{argmin}_{R_{kj}, I_{kj}} L(\{W_k^{i+1}\}, \{R_{kj}\}, \{I_{kj}\}, \{\Gamma_{kj}^i\}, \{\Lambda_{kj}^i\})$$

[S3] Update the multipliers:

$$\Gamma_{kj}^{i+1} := \Gamma_{kj}^i + c[\mathcal{R}(W_k^j)^{i+1} - R_{kj}^{i+1}]$$

$$\Lambda_{kj}^{i+1} = \Lambda_{kj}^i + c[\mathcal{I}(W_k^j)^{i+1} - I_{kj}^{i+1}]:$$

All the variables can be easily initialized to 0. Clearly, the optimization problem in [S1] is decomposable over all K control areas. Moreover, by exploiting the problem structure, the three steps can be simplified as follows.

[S1] Update $W_k^{i+1}$ per area k:

$$W_k^{i+1} := \quad (13.B)$$

$$\operatorname{argmin}_{W_k \succeq 0} f_k(W_k) + \sum_{j \in \mathcal{A}_k} Tr[\Gamma_{kj}^i \mathcal{R}(W_k^j)] + \sum_{j \in \mathcal{A}_k} Tr[\Lambda_{kj}^i \mathcal{I}(W_k^j)] +$$

-continued $$\sum_{j \in \mathcal{A}_k} \frac{c}{2} |\mathcal{R}(W_k^j) - R_{kj}^i|_F^2 + \sum_{j \in \mathcal{A}_k} \frac{c}{2} |\mathcal{I}(W_k^j) - I_{kj}^i|_F^2 :.$$

[S2] Update the pair of auxiliary variables per area k:

$$R_{kj}^{i+1} = \frac{1}{2} [\mathcal{R}(W_k^j)^{i+1} + \mathcal{R}(W_j^k)^{i+1}] \quad (14.B)$$

$$I_{kj}^{i+1} = \frac{1}{2} [\mathcal{I}(W_k^j)^{i+1} + \mathcal{I}(W_j^k)^{i+1}] :. \quad (15.B)$$

[S3] Update the pair of multipliers per area k:

$$\Gamma_{kj}^{i+1} := \Gamma_{kj}^i + \frac{c}{2} [\mathcal{R}(W_k^j)^{i+1} - \mathcal{R}(W_j^k)^{i+1}] \quad (16.B)$$

$$\Lambda_{kj}^{i+1} = \Lambda_{kj}^i + \frac{c}{2} [\mathcal{I}(W_k^j)^{i+1} - \mathcal{I}(W_j^k)^{i+1}] :. \quad (17.B)$$

Since the LS error $f_k$ is quadratic, the cost in 13.B) is convex in $W_k$, and can be formulated as an SDP using Schur's complement lemma. Hence, [S1] amounts to solving local problems that scale with the number of buses controlled by each regional center, which greatly reduces the computational burden as compared to the global SDP problem. In addition, both [S2] and [S3] involve linear iterations and are very efficient. This completes the iterations for the distributed SE solver among multiple areas. A couple of remarks are now in order.

Remark 1.B (Estimation Error Criteria)

Compared to the distributed OPF methods with linear or at most quadratic costs, the proposed distributed SE framework can accommodate more general error cost functions $f_k$ for various estimation purposes. For robust estimation purposes, the $l_1$-norm of estimation errors can be used. A combination of the $l_1$ and $l_2$ norms may be used for improved accuracy in joint estimation of the state and extraction of the outliers. Both error criteria will lead to a reformulation of (13.B) in [S1] as a local convex SDP problem.

Remark 2.B (Data Exchange Overhead and Privacy)

At first glance, one may think that in steps [S1]-[S3] per iteration i neighboring control centers need to exchange the submatrices $\{(W_k^j)^i\}$ related to the common buses, as well as the associated multipliers $\{\Gamma_{kj}^i\}$ and $\{\Lambda_{kj}^i\}$. A closer look however, reveals that exchanging common submatrices suffices as the multipliers can be readily updated locally with coordination among neighboring areas, e.g., by initializing all to zero. This suggests considerable reduction in the communication overhead for the ADMM iterations. Furthermore, the proposed scheme neither requires exchanging local measurements nor local network topology. It suffices to only share a small portion of local state matrices. From the data privacy perspective, individual operators enjoy this benefit as a natural bonus of the novel multi-area SE method.

Upon convergence, each control center obtains the iterate $W_k^i$ as the estimate of its local matrix $V_{(k)}$ of the centralized SDR-based SE problem (9.B). Nonetheless, this SDP problem is only a relaxed version of the original SE in (4.B); hence, its solution may have rank greater than 1, which requires recovering a feasible local state estimate $\hat{v}_{(k)}^i$ from $W_k^i$. This is possible by eigen-decomposing $$W_k^i = \sum_{r=1}^{R} \lambda_r u_r u_r^{\mathcal{H}} \text{ per area } k,$$

where $R:=\text{rank}(W_k^i)$, $\lambda_1 \geq \ldots \geq \lambda_R > 0$ denote the positive ordered eigenvalues, and $\{u_r \in \mathbb{C}^{|N_{(k)}|}\}_{r=1}^{R}$ are the corresponding eigenvectors. Since the best (in the minimum-norm sense) rank-one approximation of $W_k^i$ is $\lambda_1 u_1 u_1^H$, the state estimate can be chosen equal to $\hat{v}_{(k)}^i := \sqrt{\lambda_1} u_1$. Besides this eigenvector approach, randomization offers another way to recover the vector estimate, with the potential to achieve quantifiable approximation accuracy. The basic idea is to generate multiple Gaussian distributed random vectors $v \sim \mathcal{CN}(0, W_k^i)$, and pick the one with the minimum error cost.

Numerical Simulations

The performance of the proposed distributed multi-area SE method was tested using the IEEE 14-bus system [Error! Reference source not found.] with the area partition depicted in FIG. 8. All four areas measure their local bus voltage magnitudes, as well as real and reactive power flow levels at the lines marked by the squares, which leads to the augmented local states as indicated by the dotted lassos. There are three overlapping areas, which correspond to the equality constraints enforced in (11.B). The interior-point method based convex solver SeDuMi is used to solve for the centralized SDR-based SE problem, as well as the iterative local matrix update (13.B) in [S1].

Figure 9A:
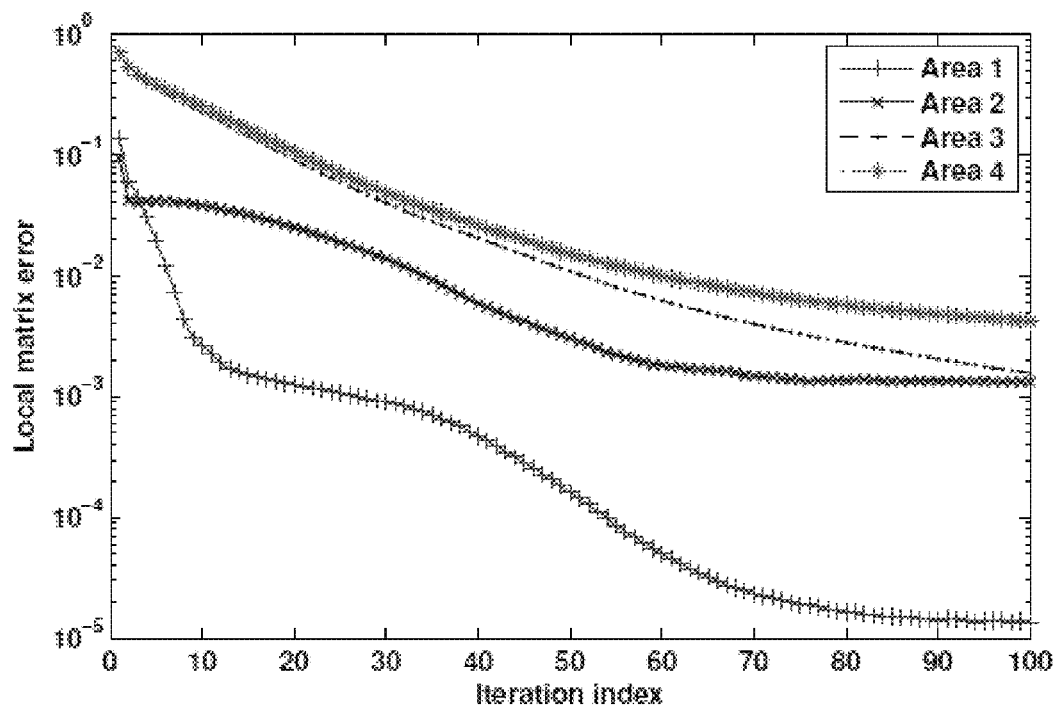
FIG. 9A is a graph that plots local matrix error versus an iteration index for distributed semidefinite estimation.
Figure 9B:
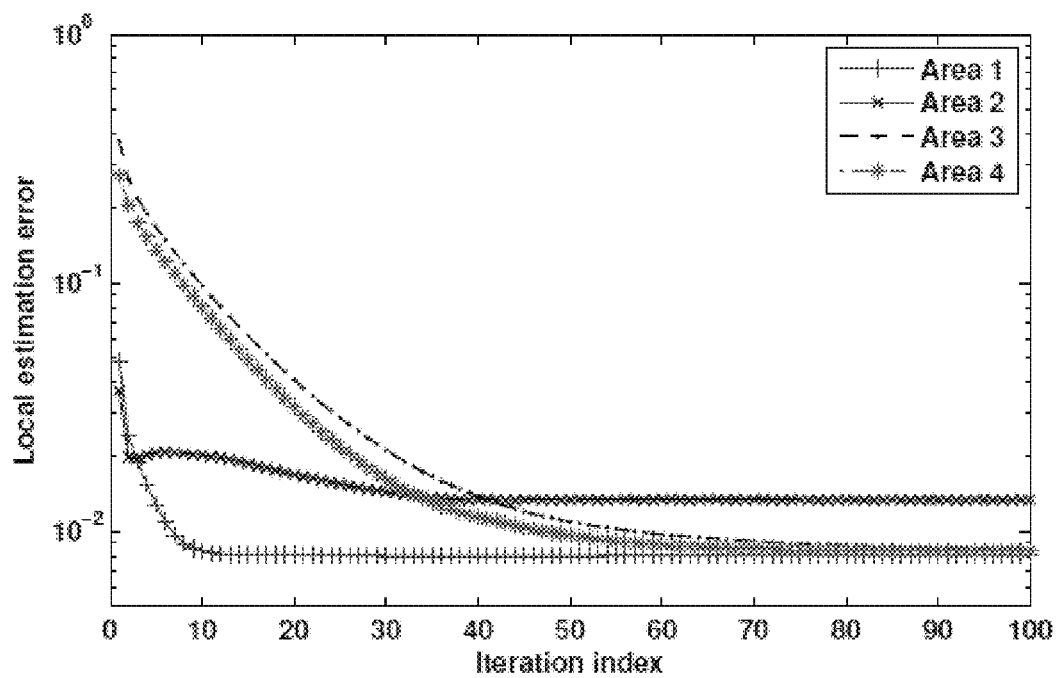
FIG. 9B is a graph that plots local estimation error versus an iteration index for distributed semidefinite estimation.

To illustrate convergence of the ADMM iterations to the centralized SE solution $\hat{V}$, the local matrix error $|W_k^i - V_{(k)}|_F$ is plotted versus the iteration index i in FIG. 9A for every control area k. Clearly, all the local iterates converge (with a linear rate) to their counterparts in the centralized solution. In addition, as the estimation task is of interest here, the local estimation error $|\hat{v}_k^i - v_k|_2$ is also plotted in FIG. 9B, where $\hat{v}_k$ is the estimate of bus voltages at $\mathcal{H}_k$ obtained from the iterate $W_k^i$ using the eigen-decomposition method. Interestingly, the estimation error curves converge within estimation accuracy of around $10^{-2}$ after about 40 iterations (less than 20 iterations for Areas 1 and 2), even though the local matrix has not yet converged. This demonstrates that in practice it is possible to achieve the centralized estimation accuracy with a limited number of iterations, which in turn leads to affordable inter-area communication overhead.

Distributed SE based on SCADA measurements was described for nonlinear AC power systems. To overcome the non-convexity of casting the centralized SE as a nonlinear LS problem along with the convergence challenges of the companion gradient solvers, an SDR-based formulation was leveraged here involving the outer-product matrix of the wanted state. The described multi-area SE approach offers not only computational reduction, but also the potential of achieving global optimality. With minimal data exchanges between neighboring areas, each control center updates its local state matrix with complexity that scales with the number of buses per region, and converges to the centralized solution. The proposed techniques can be readily modified to cope also with alternative convex criteria, which is useful if robustness is at a premium.

Figure 10:
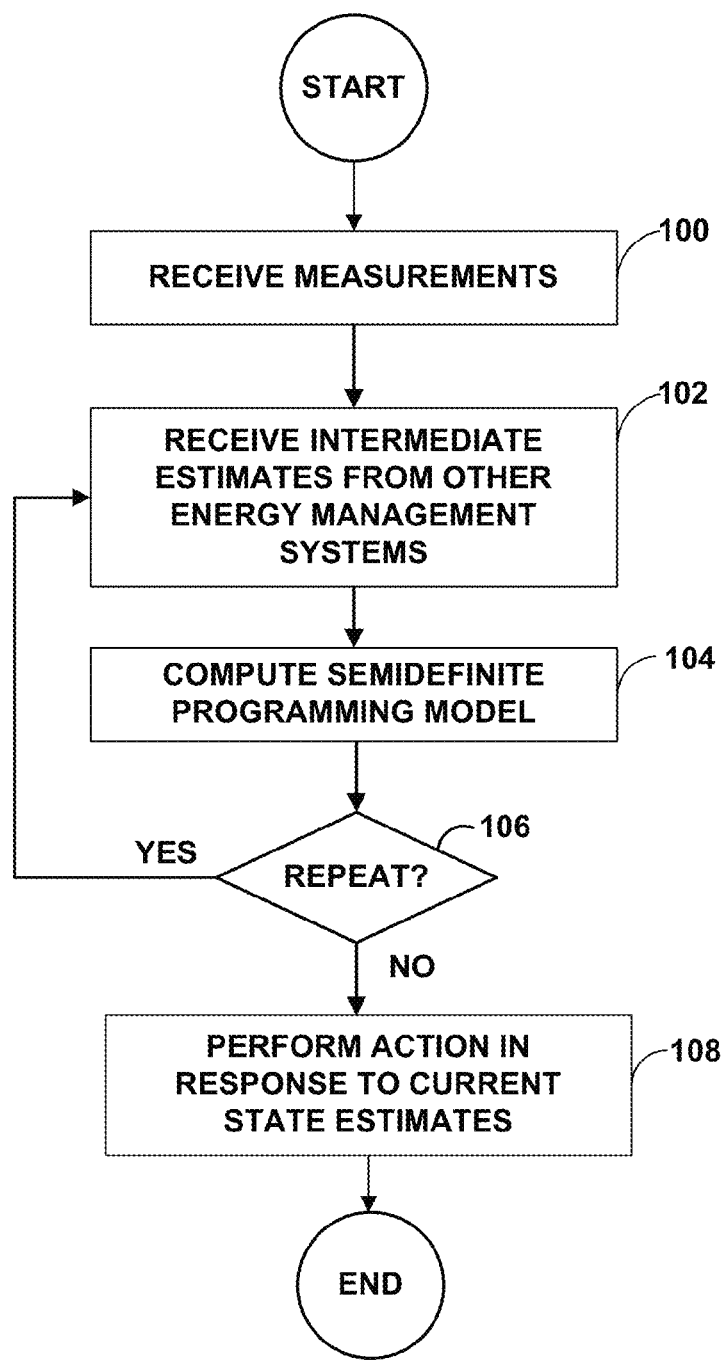
FIG. 10 is a flowchart illustrating example operation of a control device, such as an energy management system of FIG. 1 or an energy management system for any of the control areas of FIG. 8.

FIG. 10 is a flowchart illustrating example operation of a control device, such as energy management system 12 of FIG. 1 or an energy management system for any of the control areas of FIG. 8. In this example, the energy management system receives measurements of an electrical characteristic from a plurality of measurement units (MUs) posited at a subset of the power buses within the power grid (100). As described above, in some cases the energy management system may also receive intermediate results for the estimates from other energy management systems (104).

The energy management system applies semidefinite relaxation to compute (e.g., update) a semidefinite programming model for the power buses within the power grid based on the measurements any intermediate results from other systems, where the model linearly relates the estimates for the electrical characteristic to the measurements of the electrical characteristic (102).

The energy management system may iteratively update the model until determining that a sufficient solution has been reached. This may be determined, for example, upon applying a predefined number of iterations or until convergence is detected (106).

Upon computing the current solution for the state estimates for system variables for its entire respective control area, the energy management system may perform a programmed action, such as generating one or more alerts, generate reports, update accounting or billing systems (108).

Figure 11:
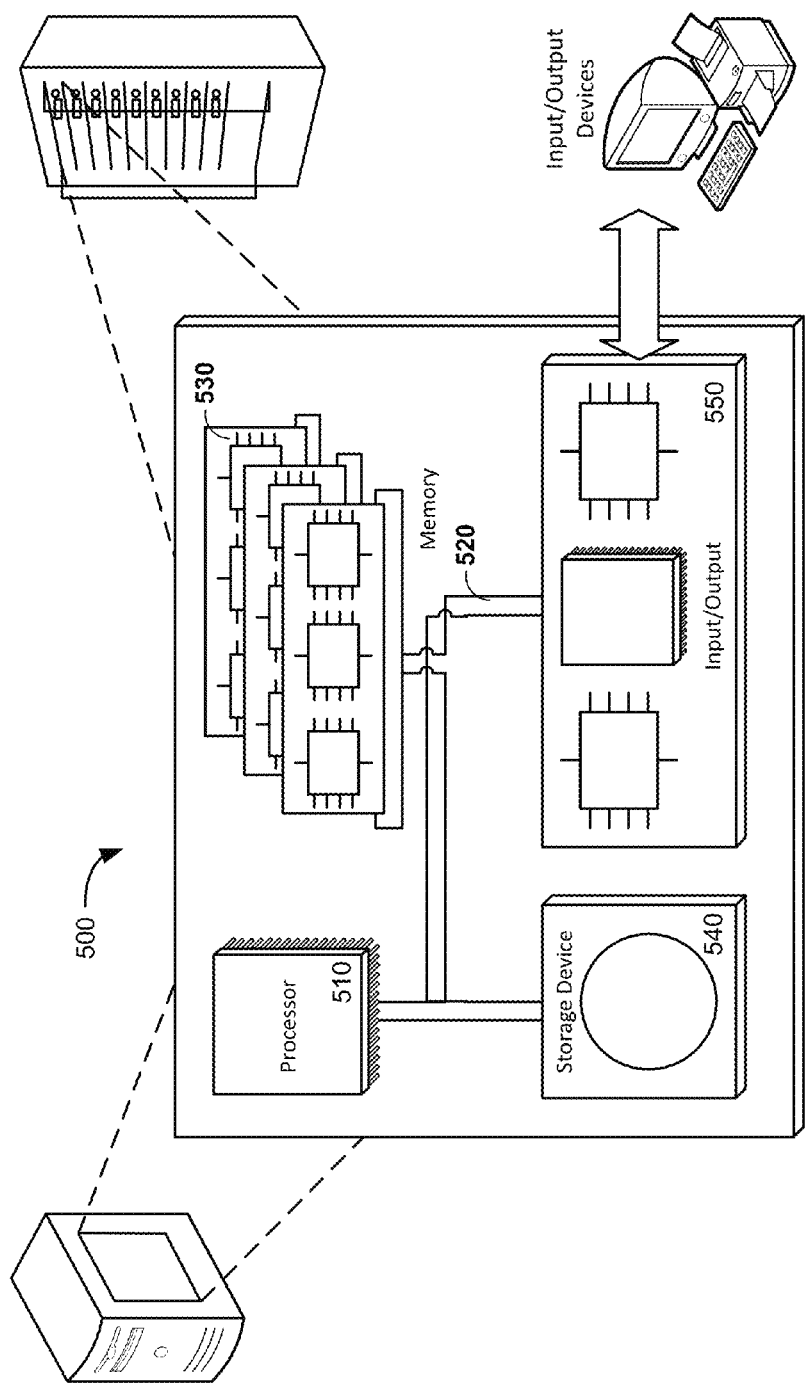
FIG. 11 is a block diagram of an example computing device operable to execute one or more of the state estimation techniques described herein.

FIG. 11 shows a detailed example of various devices that may be configured to execute program code to practice some embodiments in accordance with the current disclosure. For example, an energy management system configured to operate in accordance with one or more of the techniques described herein may be implemented as one or more of the computers 500 of FIG. 10

In this example, computer 500 includes a processor 510 that is operable to execute program instructions or software, causing the computer to perform various methods or tasks. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server as shown in FIG. 10, or any other type of computerized system such as a power grid management system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable storage medium may form part of a computer program product, which may include packaging materials. A computer-readable storage medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In general, the computer-readable storage media represents non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Although specific embodiments have been illustrated and described herein, it will be appreciated by those of ordinary skill in the art that any arrangement that achieves the same purpose, structure, or function may be substituted for the specific embodiments shown. This application is intended to cover any adaptations or variations of the embodiments described herein. It is intended that this disclosure be limited only by the claims, and the full scope of equivalents thereof.

The invention claimed is:

1. A method for estimating a state for each of a plurality of alternating current (AC) electrical power buses within a power grid, the method comprising:
receiving, with an energy management system for the power grid, measurements of an electrical characteristic from a plurality of measurement units (MUs) positioned at a subset of the power buses within the power grid;
processing the measurements of the electrical characteristic with the energy management system to compute an estimate of the electrical characteristic currently occurring at each of the power buses within the power grid, the estimates of the electrical characteristic being nonlinearly related to the measurements of the electrical characteristic, wherein processing the measurements of the electrical characteristic comprises:
applying semidefinite relaxation to compute a semidefinite programming model for the power buses within the power grid that linearly relates the estimates for the electrical characteristic to the measurements of the electrical characteristic; and
iteratively processing the measurements of the electrical characteristic in accordance with the semidefinite programming model to compute a convex minimization as a solution for the estimates of the electrical characteristic; and
controlling operation of one or more of the power buses based on the computed estimates.

2. The method of claim 1, wherein the measurements of the electrical characteristic comprises measurements of one or more of a current phasor, a voltage phasor or a power phasor.

3. The method of claim 1, wherein the measurements of the electrical characteristic comprises a complex voltage at each of the power buses including: (1) a real power injection into the power grid at the power bus, (2) a real power flow to the power grid at the power bus, and (3) a voltage magnitude at the power bus.

4. The method of claim 1, wherein the measurements of the electrical characteristic are received from phasor measurement units (PMUs).

5. The method of claim 1, wherein applying semidefinite relaxation to compute a semidefinite programming model for the power buses comprises defining the set of estimates of one or more voltage phasors, $\hat{v}$, such that $$\hat{v} := \underset{v}{\operatorname{argmin}} \sum_{l=1}^{L} w_l [z_l - h_l(v)]^2.$$

6. The method of claim 1, further comprising generating a report that specifies power consumption at each of the power buses within the power grid based on the computed estimates.

7. The method of claim 6, further comprising updating an accounting system to charge respective operators of each of the power buses based on the computed estimates.

8. The method of claim 1, further comprising generating an alert based on the computed estimates.

9. The method of claim 1,
wherein the semidefinite programming model includes a state vector indicating a trustworthiness for each of the measurements, and
wherein processing the measurements comprises computing the solution by eliminating any outliers of meter measurements based on by trustworthiness of each of the measurements.

10. The method of claim 9, wherein the state vector identifies outliers including faulty measurements, bad data due to communication error and data that has been compromised due to attack.

11. The method of claim 9, wherein the semidefinite programming model includes a configurable parameter to control a required level of trustworthiness for the measurements.

12. The method of claim 1,
wherein the energy management system is one of a plurality of energy management systems associated with respective power grids, each of the energy management systems computing estimates of the electrical characteristic for electrical power buses within the respective power grid, the method further comprising:
communicating the estimates from each of the energy management systems to a central energy management system; and
iteratively processing the estimates from the energy management systems in accordance with a semidefinite programming model to compute a global solution for the estimates of the electrical characteristics for the entire plurality of power grids.

13. The method of claim 1,
wherein the energy management system is one of a plurality of energy management systems associated with respective power sub-grids that are interconnected to form the power grid, each of the power sub-grids including a subset of the electrical busses and representing a control area for the corresponding energy management system, and
wherein processing the measurements comprises, with each of the energy management systems, locally computing the state estimates of the electrical characteristic for the subset of the electrical power buses within the respective control area associated with the respective power sub-grid.

14. The method of claim 13, further comprising:
expanding the subset of the electrical power buses for a first one of the control areas to include one of the electrical busses of a second one of the control areas when a transmission line connects the first one of the control areas to the electrical bus of the second control area and the first one of the control areas includes a sensor that provides a measurement associated with the transmission line; and
communicating, during the computation of the solution for the state estimates, intermediate results for the state estimates from the second one of the control areas to the first one of the control areas for the electrical bus to which the transmission line is connected.

15. The method of claim 13, further comprising,
for each of the control areas, identifying each transmission line that connects the control area to an electrical bus within a different one of the control areas and includes a sensor that provides a measurement associated with the transmission line; and
for each of the identified transmission lines, communicating, during the computation of the solution, intermediate results for the estimates from the second one of the control areas to the first one of the control areas for the electrical bus to which the transmission line is connected.

16. A device comprising:
memory to store measurements of an electrical characteristic from a plurality of measurement units (MUs) positioned at a subset of alternating current (AC) electrical power buses within a power grid; and
one or more processors configured to execute program code to process the measurements of the electrical characteristic to compute an estimate of the electrical characteristic currently occurring at each of the power buses within the power grid, the estimates of the electrical characteristic being nonlinearly related to the measurements of the electrical characteristic,
wherein the program code is configured to apply semidefinite relaxation to compute a semidefinite programming model for the power buses within the power grid that linearly relates the estimates for the electrical characteristic to the measurements of the electrical characteristic, and iteratively process the measurements of the electrical characteristic in accordance with the semidefinite programming model to compute a convex minimization as a solution for the estimates of the electrical characteristic, and
wherein the program code is configured to control operation of one or more of the power buses based on the computed estimates.

17. The device of claim 16, wherein the measurements of the electrical characteristic comprises measurements of one or more of a current phasor, a voltage phasor or a power phasor.

18. The device of claim 16, wherein the measurements of the electrical characteristic comprises a complex voltage at each of the power buses including: (1) a real power injection into the power grid at the power bus, (2) a real power flow to the power grid at the power bus, and (3) a voltage magnitude at the power bus.

19. The device of claim 16, wherein the program code is configured to apply semidefinite relaxation to compute a semidefinite programming model for the power buses comprising defining the set of estimates of one or more voltage phasors, $\hat{v}$, such that $$\hat{v} := \arg\min_{v} \sum_{l=1}^{L} w_l [z_l - h_l(v)]^2.$$

20. The device of claim 16, wherein the program code is configured to generate a report that specifies power consumption at each of the power buses within the power grid based on the computed estimates.

21. The device of claim 16, wherein the program code is configured to update an accounting system to charge respective operators of each of the power buses based on the computed estimates.

22. The device of claim 16, wherein the program code is configured to generate an alert based on the computed estimates.

23. The device of claim 16,
wherein the semidefinite programming model includes a state vector indicating a trustworthiness for each of the measurements, and
wherein processing the measurements comprises computing the solution by eliminating any outliers of meter measurements based on by trustworthiness of each of the measurements.

24. The device of claim 23, wherein the state vector identifies outliers including faulty measurements, bad data due to communication error and data that has been compromised due to attack.

25. The device of claim 23, wherein the semidefinite programming model includes a configurable parameter to control a required level of trustworthiness for the measurements.

26. The device of claim 16, wherein device receives the measurements from a plurality of energy management systems associated with respective power grids.

27. The device of claim 16,
wherein the device comprises a first energy management system of a plurality of energy management systems associated with respective power sub-grids that are interconnected to form the power grid, each of the power sub-grids including a subset of the electrical busses and representing a control area for the corresponding energy management system, and wherein the first energy management system of the device locally computes the state estimates of the electrical characteristic for the subset of the electrical power buses within a first one of the control areas associated with the device.

28. The device of claim 27, wherein the program code is configured to expand the subset of the electrical power buses for the first one of the control areas to include one of the electrical busses of a second one of the control areas when a transmission line connects the first one of the control areas to the electrical bus of the second control area and the first one of the control areas includes a sensor that provides a measurement associated with the transmission line, and wherein the device computes the solution for the state estimates for the first one of the control areas in accordance with intermediate results for the state estimates received from the second one of the control areas for the electrical bus to which the transmission line is connected.

29. A method for controlling a power grid with an energy management system by estimating a state for each of a plurality of alternating current (AC) electrical power buses within the power grid, the method comprising:

receiving, with an energy management system for the power grid, measurements of an electrical characteristic from a plurality of measurement units (MUs) positioned at a subset of the power buses within the power grid;

processing the measurements of the electrical characteristic with the energy management system in accordance with a semidefinite programming model for the power buses within the power grid to compute an estimate of the electrical characteristic currently occurring at each of the power buses within the power grid; and controlling operation of one or more of the power buses based on the computed estimates for the state of each of the power busses.

* * * * *